US012720282B2

(12) United States Patent
Rahmani et al.

(10) Patent No.: US 12,720,282 B2
(45) Date of Patent: Aug. 25, 2026

(54) SYSTEMS AND METHODS FOR COHERENT RADIATION FROM A SWARM OF WIRELESSLY POWERED AND SYNCHRONIZED SENSOR NODES

(71) Applicant: The Regents of the University of California, Oakland, CA (US)

(72) Inventors: Hamed Rahmani, Belle Mead, NJ (US); Aydin Babakhani, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 635 days.

(21) Appl. No.: 17/997,464

(22) PCT Filed: Apr. 26, 2021

(86) PCT No.: PCT/US2021/029163

§ 371 (c)(1),
(2) Date: Oct. 28, 2022

(87) PCT Pub. No.: WO2021/222104

PCT Pub. Date: Nov. 4, 2021

(65) Prior Publication Data

US 2023/0224682 A1 Jul. 13, 2023

Related U.S. Application Data

(60) Provisional application No. 63/016,806, filed on Apr. 28, 2020.

(51) Int. Cl.
*H04W 4/38* (2018.01)
*H04W 84/18* (2009.01)

(52) U.S. Cl.
CPC .............. *H04W 4/38* (2018.02); *H04W 84/18* (2013.01)

(58) Field of Classification Search
CPC ................................ H04W 4/38; H04W 84/18
See application file for complete search history.

(56) References Cited

U.S. PATENT DOCUMENTS 10,422,214 B2 9/2019 Babakhani
2003/0102961 A1 * 6/2003 Fischer ............ G06K 19/07749 340/10.1

(Continued)

FOREIGN PATENT DOCUMENTS

WO 2021222104 A1 11/2021

OTHER PUBLICATIONS

International Preliminary Report on Patentability for International Application PCT/US2021/029163, Report issued Oct. 27, 2022, Mailed on Nov. 10, 2022, 5 Pgs.

(Continued)

*Primary Examiner* — Wen W Huang
(74) *Attorney, Agent, or Firm* — KPPB LLP

(57) ABSTRACT

Distributed wireless sensor networks are described. In an embodiment, a distributed wireless sensor network (WSN) system includes: a set of wirelessly powered microchips, and a radio frequency (RF) transceiver, wherein the RF transceiver is configured to transmit RF signals, several of the set of wirelessly powered microchips is configured to be activated when placed in proximity to the RF transceiver transmitting RF signals, each of the several sets of wirelessly powered microchips is configured to radiate back a signal, and the signals radiated by the set of wirelessly powered microchips is coherent in phase and frequency to the RF transceiver.

20 Claims, 16 Drawing Sheets

(56) References Cited

U.S. PATENT DOCUMENTS

| | | | | |
|---|---|---|---|---|
| 2007/0120677 | A1 | 5/2007 | Park et al. | |
| 2007/0126585 | A1* | 6/2007 | Okunev | G06K 7/10356 340/572.2 |
| 2012/0182147 | A1* | 7/2012 | Forster | H01Q 1/2225 340/572.7 |
| 2013/0314273 | A1 | 11/2013 | Kavaler et al. | |
| 2016/0084911 | A1 | 3/2016 | Mensah-Brown | |
| 2016/0149441 | A1 | 5/2016 | Nayak | |
| 2016/0338798 | A1 | 11/2016 | Vora et al. | |
| 2017/0170682 | A1 | 6/2017 | Mcconkey | |
| 2020/0007540 | A1* | 1/2020 | Kawaguchi | H04L 9/0861 |
| 2020/0029302 | A1 | 1/2020 | Cox et al. | |
| 2020/0200892 | A1* | 6/2020 | Rajab | G01S 13/753 |
| 2021/0165092 | A1* | 6/2021 | Hester | G01S 13/758 |
| 2022/0236115 | A1* | 7/2022 | Tailor | H04W 4/38 |

OTHER PUBLICATIONS

International Search Report and Written Opinion for International Application No. PCT/US2021/029163, Search completed Jul. 1, 2021, Mailed Aug. 4, 2021, 13 Pgs.

Zargham et al., "Fully Integrated on-Chip Coil in 0.13 μm CMOS for Wireless Power Transfer Through Biological Media", IEEE Transactions on Biomedical Circuits and Systems, Aug. 2014, vol. 9, No. 2, 13 pgs., DOI:10.1109/TBCAS.2014.2328318.

Alrajeh et al., "Localization Techniques in Wireless Sensor Networks", International Journal of Distributed Sensor Networks, Jun. 2013, Article No. 304628, pp. 1-9, DOI:10.1155/2013/304628.

Andersen et al., "A 118-mW Pulse-Based Radar SoC in 55-nm CMOS for Non-Contact Human Vital Signs Detection", IEEE Journal of Solid-State Circuits, vol. 52, No. 12, Dec. 2017, pp. 3421-3433, doi: 10.1109/JSSC.2017.2764051.

Arnitz et al., "Wireless power transfer optimization for nonlinear passive backscatter devices", 2013 IEEE International Conference on RFID, Apr. 30, 2013, pp. 245-252, DOI:10.1109/RFID.2013.6548161.

Besnoff et al., "Battery-free multichannel digital ECG biotelemetry using UHF RFID techniques", 2013 IEEE International Conference on RFID, 2013, pp. 16-22.

Bourdel et al., "A 9-pJ/pulse 1.42-Vpp OOK CMOS UWB pulse generator for the 3.1-10.6-GHz FCC band", IEEE Transactions on Microwave Theory and Techniques, vol. 58, No. 1, 2009, pp. 65-73.

Chae et al., "A 128-channel 6 mW wireless neural recording IC with spike feature extraction and UWB transmitter", IEEE Transactions on Neural Systems and Rehabilitation Engineering, vol. 17, No. 4, 2009, pp. 312-321.

Cheng et al., "Printed slot planar inverted cone antenna for ultrawideband applications", IEEE Antennas and Wireless Propagation Letters, 2008, vol. 7, pp. 18-21.

Cook et al., "RFID-Based Sensors for "Zero-Power" Autonomous Wireless Sensor Networks", IEEE Sensors Journal, Aug. 2014, vol. 18, No. 8, pp. 2419-2431, DOI:10.1109/JSEN.2013.2297436.

Costanzo et al., "Energizing 5G", IEEE Microwave Magazine, May 2017, pp. 125-136, published Apr. 7, 2017, DOI: 10.1109/MMM.2017.2664001.

Cota-Ruiz et al., "A Distributed Localization Algorithm for Wireless Sensor Networks Based on the Solutions of Spatially-Constrained Local Problems", IEEE Sensors Journal, Jun. 2013, vol. 13, No. 6, DOI: 10.1109/JSEN.2013.2249660.

Cruz et al., "Hybrid UHF/UWB antenna for passive indoor identification and localization systems", IEEE Transactions on Antennas and Propagation, vol. 61, No. 1, pp. 354-361, 2013.

Dickson, "On-chip high-voltage generation in MNOS integrated circuits using an improved voltage multiplier technique", IEEE Journal of Solid-State Circuits, vol. 11, No. 3, 1976, pp. 374-378, doi: 10.1109/JSSC.1976.1050739.

Iliev et al., "Review and Comparison of Spatial Localization Methods for Low-Power Wireless Sensor Networks", IEEE Sensors Journal, Oct. 2015, vol. 15, No. 10, pp. 5971-5987, DOI:10.1109/JSEN.2015.2450742.

Jamali et al., "Wireless Time Transfer With Subpicosecond Accuracy Based on a Fully Integrated Injection-Locked Picosecond Pulse Detector", IEEE Transactions on Microwave Theory and Techniques, Jan. 2020, vol. 68, No. 1. pp. 160-169, DOI:10.1109/TMTT.2019.2934452.

Jia et al., "RFID technology and its applications in Internet of Things (iot)", 2012 2nd International Conference of consumer Electronics, Communications and Networks (CWCNet), Apr. 2012, pp. 1282-1285, DOI:10.1109/CECNet.2012.6201508.

Kang et al., "Design and Optimization of Area-Constrained Wirelessly Powered CMOS UWB SoC for localization applications", IEEE Transactions on Microwave Theory and Techniques, vol. 64, No. 4, Apr. 2016, pp. 1042-1054, doi: 10.1109/TMTT.2016.2536663.

Koski et al., "Fundamental Characteristics of Electro-Textiles in Wearable UHF RFID Patch Antennas for Body-Centric Sensing Systems", IEEE Transactions on Antennas and Propagation, vol. 62, No. 12, Dec. 2014, Date of Publication: Oct. 20, 2014, pp. 6454-6462.

Le et al., "Efficient Far-Field Radio Frequency Energy Harvesting for Passively Powered Sensor Networks", IEEE Journal of Solid-State Circuits, vol. 43, No. 5, May 2008, pp. 1287-1302, doi: 10.1109/JSSC.2008.920318.

Lu et al., "Performance evaluation of a long-range RFID tag powered by a vibration energy harvester", IEEE Antennas and Wireless Propagation Letters, vol. 16, 2017, pp. 1832-1835.

Lyu et al., "A 100-M/s 2.6-pJ/pulse compact UWB impulse transmitter based on antenna-and-pulsegenerator codesign", IEICE Electronics Express, vol. 16, No. 24, 2019, 20190672-20190672, 4 pgs.

Lyu et al., "A 430-Mhz Wirelessly Powered Implantable Pulse Generator With Intensity/Rate Control and Sub-1 μA Quiescent Current Consumption", IEEE Transactions on Biomedical Circuits and Systems, vol. 13, No. 1, Feb. 2019, pp. 180-190, DOI: 10.1109/TBCAS.2018.2879357.

Lyu et al., "A 915-MHz Far-Field Energy Harvester With—22-dBm Sensitivity and 3-V Output Voltage Based on Antenna-and-Rectifier Codesign", IEEE Microwave and Wireless Components Letters, vol. 29, No. 8, 2019, pp. 557-559.

Lyu et al., "An Energy-Efficient Wirelessly Powered Millimeter-Scale Neurostimulator Implant Based on Systematic Codesign of an Inductive Loop Antenna and a Custom Rectifier", IEEE Transactions on Biomedical Circuits and Systems, vol. 12, No. 5, Oct. 2018, pp. 1131-1143, DOI: 10.1109/TBCAS.2018.2852680.

Mandal et al., "Low-power CMOS rectifier design for RFID applications", IEEE Transactions on Circuits and Systems I: Regular Papers, vol. 54, No. 6, Jul. 2007, pp. 1177-1188, DOI:10.1109/TCSI.2007.895229.

Marrocco et al., "The art of UHF RFID antenna design: Impedance matching and size-reduction techniques", IEEE Antennas and Propagation Magazine, vol. 50, No. 1, 2008, pp. 66-79.

Nagpurkar et al., "An overview of WSN and RFID network integration", in 2015 2nd International Conference on Electronics and Communication Systems (ICECS), Feb. 26-27, 2015, pp. 497-502, DOI: 10.1109/ECS.2015.7124956.

Nikitin et al., "Power reflection coefficient analysis for complex impedances in RFID tag design", IEEE Transactions on Microwave Theory and Techniques, vol. 53, No. 9, 2005, pp. 2721-2725.

Occhiuzzi et al., "Modeling, design and experimentation of wearable RFID sensor tag", IEEE Transactions on Antennas and Propagation, vol. 58, No. 8, 2010, pp. 2490-2498.

Papotto et al., "A 90-nm CMOS 5-Mbps Crystal-Less RF-Powered Transceiver for Wireless Sensor Network Nodes", EEE Journal of Solid-State Circuits, Feb. 2014, vol. 49, No. 2, pp. 335-346, DOI:10.1109/JSSC.2013.2285371.

Puccinelli et al., "Wireless Sensor Networks: Applications and Challenges of Ubiquitous Sensing", IEEE Circuits and Systems Magazine, Third Quarter 2005, vol. 5, No. 3, pp. 19-31.

Rahmani et al., "A 1.6mm3 Wirelessly Powered Reconfigurable FDD Radio with On-Chip Antennas Achieving 4.7 pJ/b TX and 1 pJ/b RX Energy Efficiencies for Medical Implants", Conference: 2020 IEEE Custom Integrated Circuits Conference (CICC), Apr. 2020, 4 pgs., doi:10.1109/CICC48029.2020.9075935.

(56) References Cited

OTHER PUBLICATIONS

Rahmani et al., “A 434 MHz Dual-Mode Power Harvesting System with an On-chip Coil in 180 nm CMOS SOI for mm-Sized Implants”, Conference: A 434 MHz Dual-Mode Power Harvesting System with an On-chip Coil in 180 nm CMOS SOI for mm-Sized Implants, Mar. 2018, pp. 1130-1133, DOI:10.1109/MWSYM.2018.8439642.
Rahmani et al., “A Dual-Mode RF Power Harvesting System With an On-Chip Coil in 180-nm SOI CMOS for Millimeter-Sized Biomedical Implants”, IEEE Transactions on Microwave Theory and Techniques, vol. 67, No. 1, Jan. 1, 2019, pp. 414-428, XP011695538, ISSN: 0018-9480, DOI:10.1109/TMTT.2018.2876239.
Rahmani et al., “A Wireless Power Receiver with an On-chip Antenna for Millimeter-size Biomedical Implants in 180 nm SOI CMOS”, IEEE MTT-S International Microwave symposium (IMS), Jun. 2017, pp. 300-303.
Rahmani et al., “Coherent Radiation from a Swarm of Wirelessly Powered and Synchronized Sensor Nodes”, IEEE Sensors Journal, Oct. 1, 2020. vol, 20. No. 19, 9pgs.
Razavi, “The Role of PLLs in Future Wireline Transmitters”, IEEE Transactions on Circuits and Systems I: Regular Papers Aug. 2009, vol. 56, Issue: 8, pp. 1786-1793, Jul. 14, 2009, DOI: 10.1109/TCSI.2009.2027507.
Riaz et al., “A novel design of UHF RFID passive tag antenna targeting smart cards limited area”, 2018 IEEE International Conference on Consumer Electronics (ICCE), 2018, 4 pgs.
Schleicher et al., “IR-UWB radar demonstrator for ultra-fine movement detection and vital-sign monitoring”, IEEE transactions on microwave theory and techniques, vol. 61, No. 5, pp. 2076-2085, 2013.
Seo et al., “A Feedback-Based Distributed Phased Array Technique and Its Application To 60-GHz Wireless Sensor Network”, in 2008 IEEE MTT-S International Microwave Symposium Digest, Jun. 2008, pp. 683-686.
Stoopman et al., “Co-Design of a CMOS Rectifier and Small Loop Antenna for Highly Sensitive RF Energy Harvesters”, IEEE Journal of Solid-State Circuits, vol. 49, No. 3, Mar. 2014, pp. 622-634, doi: 10.1109/JSSC.2014.2302793.
Sun et al., “A wirelessly powered injection-locked oscillator with on-chip antennas in 180nm SOI CMOS”, 2016 IEEE MTT-S International Microwave Symposium (IMS), Aug. 11, 2016, pp. 1-3 [online], [retrieved on Aug. 14, 2020]. Retrieved from the Internet <URL: https://ieeexplore .ieee.org/abstract/document/7540249>, entire document.
Sun et al., “Wirelessly-Powered Dielectric Sensor With On-Chip Antennas in 180 nm SOI CMOS Process”, IEEE Sensors Journal, Apr. 1, 2019, vol. 19, Issue 7, pp. 2613-2620, Date of Publication Dec. 19, 2018, DOI: 10.1109/JSEN.2018.2888620.
Tan et al., “A 1.2-V 8.3-nJ CMOS humidity sensor for RFID applications”, IEEE Journal of Solid-State Circuits, vol. 48, No. 10, pp. 2469-2477, 2013.
Tang, “DOA estimation based on MUSCI algorithm”, Thesis, May 16, 2014, 56 pgs.
Thomas et al., “QAM backscatter for passive UHF RFID tags”, IEEE International Conference on RFID (IEEE RFID 2010), Apr. 14-16, 2010, pp. 210-214, DOI: 10.1109/RFID.2010.5467238.
Vaz et al., “Full passive UHF tag with a temperature sensor suitable for human body temperature monitoring”, IEEE Transactions on Circuits and Systems II: Express Briefs, vol. 57, No. 2, pp. 95-99, 2010.
Wang et al., “Data cleaning for RFID and WSN integration”, IEEE Transactions on Industrial Informatics, Feb. 2014, vol. 10, No. 1, pp. 408-418, DOI: 10.1109/TII.2013.2250510.
Wang et al., “Single-antenna Doppler radars using self and mutual injection locking for vital sign detection with random body movement cancellation”, IEEE Transactions on Microwave Theory and Techniques, vol. 59, No. 12, pp. 3577-3587, 2011.
Wen et al., “Improved Music Algorithm for Multiple Noncoherent Subarrays”, IEEE Signal Processing Letters, May 2014. vol. 21, No. 5, pp. 527-530, DOI: 10.1109/LSP.2014.2308271.
Yakovlev et al., “An 11 μW Sub-pJ/bit Reconfigurable Transceiver for mm-Sized Wireless Implants”, IEEE Transactions on Biomedical Circuits and Systems, vol. 10, No. 1, Sep. 2013, 4 pgs., doi: 10.1109/CICC.2013.6658501.
Yang et al., “Wearable RFID-enabled sensor nodes for biomedical applications”, 58th Electronic Components and Technology Conference, 2008, pp. 2156-2159.
Yeager et al., “A 9 μA, Addressable Gen2 Sensor Tag for Biosignal Acquisition”, IEEE Journal of Solid-State Circuits, vol. 45, No. 10, pp. 2198-2209, 2010.
Cherivirala et al., “Wirelessly Powered Microchips for Mapping Hydraulic Fractures”, SPE Journal, Aug. 2019, vol. 24, No. 04, pp. 1830-1838, Paper No. SPE-194491-PA, https://doi.org/10.2118/194491-P.

* cited by examiner

SYSTEMS AND METHODS FOR COHERENT RADIATION FROM A SWARM OF WIRELESSLY POWERED AND SYNCHRONIZED SENSOR NODES

CROSS REFERENCE TO RELATED APPLICATIONS

The current application is a national stage of PCT Patent Application No. PCT/US2021/029163, entitled "Systems and Methods for Coherent Radiation From a Swarm of Wirelessly Powered and Synchronized Sensor Nodes" to Rahmani et al., filed Apr. 26, 2021, which claims the benefit of U.S. Provisional Patent Application No. 63/016,806 entitled "Sytems and Methods for Coherent Radiation From a Swarm of Wirelessly Powered and Synchronized Sensor Nodes" to Rahmani et al., filed Apr. 28, 2020, the disclosures of which are incorporated herein by reference in their entirety.

FIELD OF THE INVENTION

The present invention generally relates to wireless sensor networks and more specifically, to distributed sensor network systems based on integrated microchips.

BACKGROUND

Internet of Things (IoT) and its emerging applications have revolutionized wireless sensor networks in recent years. A robust sensor network can be formed by an array of battery-less sensing nodes that harvest energy from the environment. These self-powered nodes can provide opportunities in many applications such as environmental sensing and medical implants. These sensors can operate for a long time in a harsh environment. In many applications, the battery-less nodes can be millimeter-scale while capable of carrying complex functions under sever power budgets. They can perform energy harvesting, sensing, and wireless communication.

SUMMARY OF THE INVENTION

Distributed sensor network systems based on integrated microchips are described. In an embodiment, a distributed wireless sensor network (WSN) system includes: a set of wirelessly powered microchips; a radio frequency (RF) transceiver; where: the RF transceiver is configured to transmit RF signals; several of the set of wirelessly powered microchips is configured to be activated when placed in proximity to the RF transceiver transmitting RF signals; each of the several of the set of wirelessly powered microchips is configured to radiate back a signal; and the signals radiated by the several of the set of wirelessly powered microchips is coherent in phase and frequency to the RF transceiver.

In a further embodiment, each of the set of wirelessly powered microchips includes a wireless power harvesting system and a transmitter.

In a further embodiment, each of the set of wirelessly powered microchips is configured to be activated upon receiving a minimum received power.

In a further embodiment, each of the set of wirelessly powered microchips comprises a receiving antenna and a transmitting antenna.

In a further embodiment, the RF transceiver comprises a transmitting antenna and a receiving antenna.

In a further embodiment, each of the set of wirelessly powered microchips is configured to receive a received power based on relative polarization of the microchip's receiving antenna and the RF transceiver's transmitting antenna.

In a further embodiment, the RF transceiver is configured to receive a received power from each of the set of wirelessly powered microchips based upon relative polarization of the microchip's transmitting antenna and the RF transceiver's receiving antenna.

In a further embodiment, each of the set of wirelessly powered microchips is configured to utilize three separate on-chip dipole antennas.

In a further embodiment, a first antenna of the three separate on-chip dipole antennas is configured to receive a wireless power, a second antenna of the three separate on-chip dipole antennas is configured to receive a wireless reference signal, and a third antenna of the three separate on-chip dipole antennas is configured to transmit back a coherent wireless signal.

In a further embodiment, each of the set of wirelessly powered microchips uses one or two antennas for receiving the wireless power, receiving the wireless reference signal, and transmitting back a coherent wireless signal.

In a further embodiment, the set of wirelessly powered microchips are distributed in an uneven manner within an environment, wherein their orientations and positions are randomly placed.

In a further embodiment, the RF transceiver is moved through an environment and receipt of the signals radiated by the plurality of the set of wirelessly powered microchips by the RF transceiver is utilized for localization, whereby locations of the plurality of the set of wirelessly powered microchips are determined.

In a further embodiment, an amplitude of RF signals transmitted by the RF transceiver is changed to activate different sets of wirelessly powered microchips for localization.

In a further embodiment, an amplitude of the RF signals transmitted by the RF transceiver is increased to active microchips located at further distances from the RF transceiver.

In a further embodiment, a frequency of the RF signals transmitted by the RF transceiver is changed to obtain information regarding a surrounding environment.

In a further embodiment includes using a machine learning process to identify a SWARM signal signature for a particular measurement objective.

In a further embodiment, different sets of wirelessly powered microchips are activated for different settings of the RF transceiver.

In a further embodiment, a microchip is configured to sense a surrounding environment.

In a further embodiment, a microchip is configured to sense at least one characteristic with respect to a surrounding environment selected from the group consisting of a temperature, pressure, flow rate, chemical substance, and dielectric constant of a surrounding environment.

In a further embodiment, the measurement objective is to extract a geometry of a physical structure of an underground fracture network.

DETAILED DESCRIPTION OF THE DRAWINGS

Figure 1:
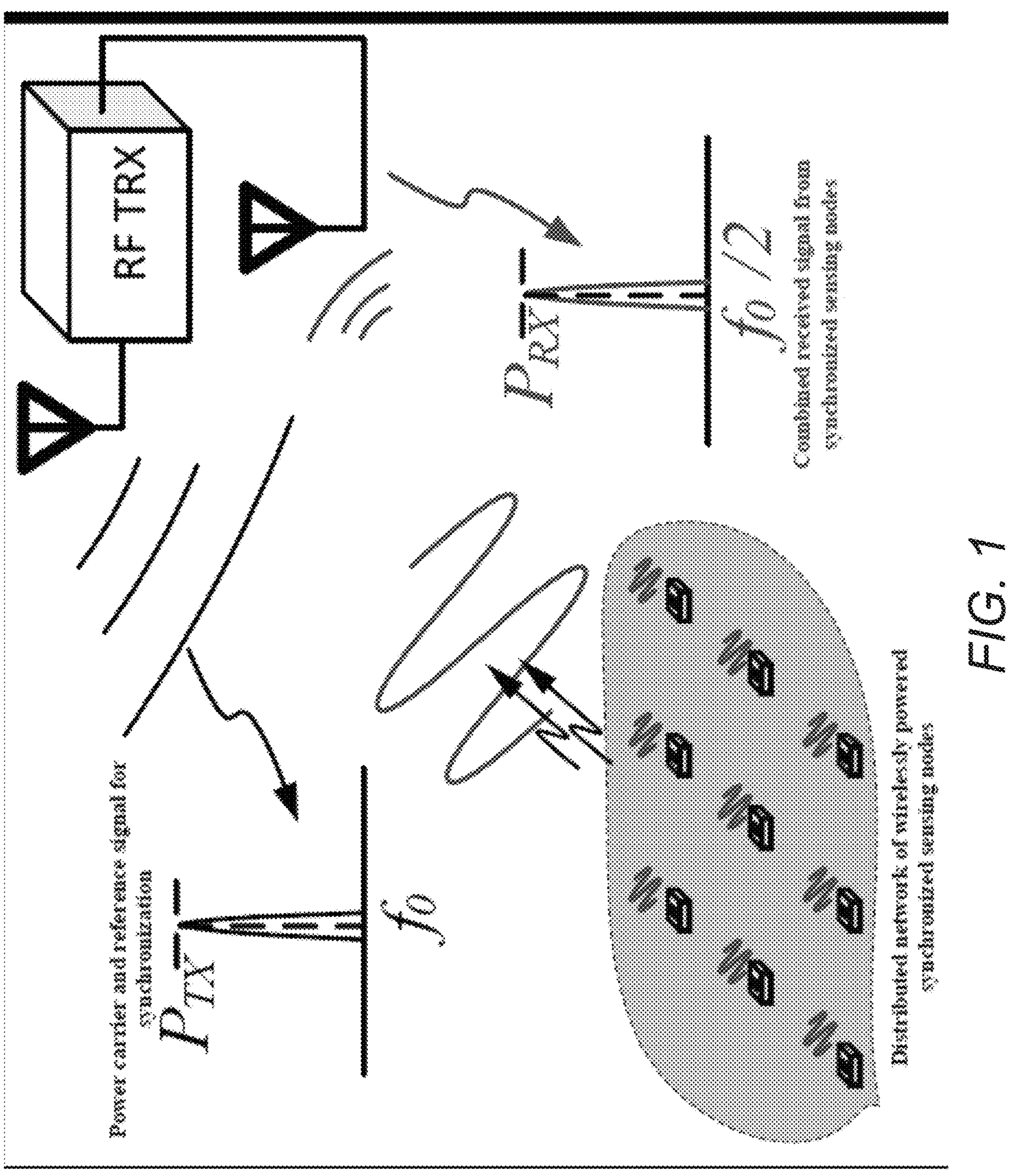
FIG. 1 illustrates a distributed system where multiple microchips are used as individual nodes to form a distributed sensor network in accordance with an embodiment of the invention.

Turning now to the drawings, systems and methods for coherent radiation from a swarm of wirelessly powered and synchronized sensor nodes in accordance with various embodiments of the invention are illustrated. In many embodiments, systems and methods for coherent radiation from a swarm of wirelessly powered and synchronized sensor nodes can be utilized to synchronize a swarm of sensor nodes in the radio frequency (RF) domain and to produce coherent radiation from sensor nodes in order to increase the amplitude of a reflected signal. In various embodiments, a wireless sensor network (WSN) can be formed by an array of wirelessly powered microchips, which, upon activation, can radiate back an RF signal. In many embodiments, the phase of the radiated signals from each microchip can be synchronized using a wireless reference signal, which can result in a coherent amplitude combining and power amplification. In many embodiments, energy harvesting microchips can be integrated on a CMOS silicon chip having a mm-sized form-factor in order to meet the demands of WSN systems that utilize self-powered sensing nodes that carry sensing and data communication tasks under severe power budgets. Compatibility with CMOS technology and on-chip implementation can result in significant cost reduction and sensor density improvement.

In several embodiments, distributed sensor nodes can be utilized in sensing applications such as localization. In many embodiments, a set of wirelessly powered microchips are distributed in an uneven manner within an environment. In various embodiments, gathered information from these sensors can be combined with proper localization processes, such as Multiple Signal Classification (MUSIC), in order to locate position of distributed nodes. Performance of localization processes can be controlled by signal to noise (SNR) ratio of a received signal. In many embodiments, systems and methods for coherent radiation from a swarm of wirelessly powered and synchronized sensor node can be utilized to tackle path loss issue in a WSN with mm-sized sensing nodes. While specific localization processes are described above, any of a variety of localization processes can be utilized in accordance with various embodiments of the invention.

In various embodiments, coherent power combining can be achieved by injection-locked power oscillators, and can be an effective method to overcome the path loss and to compensate the limited power level radiated from a single microchip. In certain embodiments, the sensing microchips can receive wireless power through a far-field RF link and the power carrier can also serve as a reference signal to synchronize the distributed sensing microchips. In many embodiments, systems and methods for coherent radiation from a swarm of wirelessly powered and synchronized sensor node can be utilized to provide a low cost solution for sensing and localization applications utilizing small form-factor microchips. In several embodiments, orientation of the sensing microchips can determine whether they will be activated. In many embodiments, the sensing microchips can set a threshold level of power that may need to be met in order to be activated.

In several embodiments, systems and methods for coherent radiation from a swarm of wirelessly powered and synchronized sensor nodes can increase operating range of the sensing nodes by forming a synchronized array of microchips that can collectively produce strong coherent radiation back to a receiver. In various embodiments, the sensing microchips can be fabricated (but not limited to) in a 180-nm CMOS silicon-on-insulator (SOI) technology. Each microchip can occupy a total area of 3.9×0.7 $mm^2$ that can include three on-chip dipole antennas that can be used for power delivery, injection locking, and back RF reflection. Note that the specific total area can vary depending upon the requirements of a given application in accordance with various embodiments of the invention. In certain embodiments, measurement results show that a reference signal in a frequency range of 7.72-7.79 GHz can successfully synchronize the reflected signals radiated from the microchips through a sub-harmonic injection locking scheme. Note that the specific number for frequency range can vary. A wireless reference signal of 7.733 GHz can synchronize an array of 2×2 microchips. The microchips can be locked to half of the reference frequency and can produce coherent radiation at 3.866 GHz. This scheme can result in a power elevation of ~12 dB on the reader side. Note that the specific frequency of the reference signal, number of microchips in the array and power level can vary.

Systems and methods for coherent radiation from a swarm of wirelessly powered and synchronized sensor nodes in accordance with an embodiment of the invention are illustrated in FIG. 1. As shown in FIG. 1, a distributed system is illustrated where multiple microchips are used as individual nodes to form a distributed sensor network. An RF transmitter can be utilized to transmit RF signals at a frequency $f_0$ to power up wirelessly the microchips. In a number of embodiments, whether an individual microchip is powered up will depend upon the coupling between the RF transmitter and the microchip. Accordingly, microchips that are likely to contribute destructively often fail to activate and the subset of microchips that are activated are likely to transmit in a manner that results in the signals received at an RF receiver being coherent and in phase. As can readily be appreciated, when the sensors described herein are oriented randomly and/or in a non-uniform manner, due to coherent frequency and phase locking, the net signal received by the transceiver can be increased as the number of sensors increase. Once the transmitter power is reduced, the synchronized microchips can be activated when a receiver is placed in the operating region of a sensor node and can activate the sensor nodes in the receiver's proximity. The microchips can then radiate back at a frequency $f_{0/2}$. The radiated back signal can be received at the receiver and can be read and sent to a computer for processing. In the illustrated embodiment, the wireless sensor network can be utilized for localization purposes by detecting the microchips that are placed in the sensing environment. In many embodiments, different types of measurements for localization can be obtained using different techniques. In certain embodiments, an amplitude of a transmit signal can be increased and different microchips may then radiate back at different amplitude levels based on the distance from the transmitter. Accordingly, a transmitter power can be ramped up and the level of the signal received from the swarm of microchips can be a function of the amplitude of the transmit signal. This information can be used for localization and other types of measurements. For example, at a very low transmit power level, only the microchips that are nearby within a threshold distance may be activated and return a signal. The transmitter power can be increased in order to activate microchips at further distances and thus the particular swarm signal received from a set of microchips can be a function of the amplitude of the transmit signal.

In many embodiments, the transmitter and recevier can be moved and measurements can be repeated similar to a synthetic aperature radar (SAR) in order to obtain information and other types of measurements that can be used for localization. Certain embodiments can also use different frequency sweeping techniques and measure a swarm response accordingly. In partiuclar, the frequency of the transmitter can be changed and the measured swarm response signal can be used to obtain various types of information that can be used for localization and/or sensing. For example, different frequenices can be used to identify different materials (e.g., oil vs. water) located between a transmtiter and a microchip, which can be used for localization and/or sensing among providing various other types of information. Many embodiments can use any combination of the different techniques, including frequency sweeps, ramping up a tranmistter signal power, and/or moving a transmitter/receiver in order to obtain different types of information that can be used to ascertain characteristics of the swarm and/or the surrounding environment.

While specific systems and methods for coherent radiation from a swarm of wirelessly powered and synchronized sensor nodes are described above, any of a variety of different configurations of systems and methods for coherent radiation from a swarm of wirelessly powered and synchronized sensor nodes can be utilized including using any number of readers and/or utilizing readers that include multiple antennas and/or phased antenna arrays. An embodiment illustrating the utilization of systems and methods for coherent radiation from a swarm of wirelessly powered and synchronized sensor nodes in hydraulic fracturing are disclosed below.

The development of millimeter-scale microchips may benefit many applications and industries. For instance, battery-less mm-sized system-on-chip (SoC) devices can revolutionize the US energy industry by enabling novel mapping and localization techniques. Currently, in the US, a large number of hydraulic fracturing is performed to extract oil and gas from tight reservoirs. Many of these expensive fracturing jobs result in no improvement in production efficiency due to the lack of techniques to monitor the fractures and image their geometry. The development of a mm-sized SoC sensing node enables a robust WSN system since it significantly reduces the overall cost and improves sensor density rendering high-resolution mapping. Low-cost integrated microchips that are millimeter-scale and wirelessly powered can be used in large quantities to provide a map of fractures. Systems and methods for coherent radiation from a swarm of wirelessly powered and synchronized sensor nodes in accordance with an embodiment of the invention are illustrated in FIG. 2.

Figure 2:
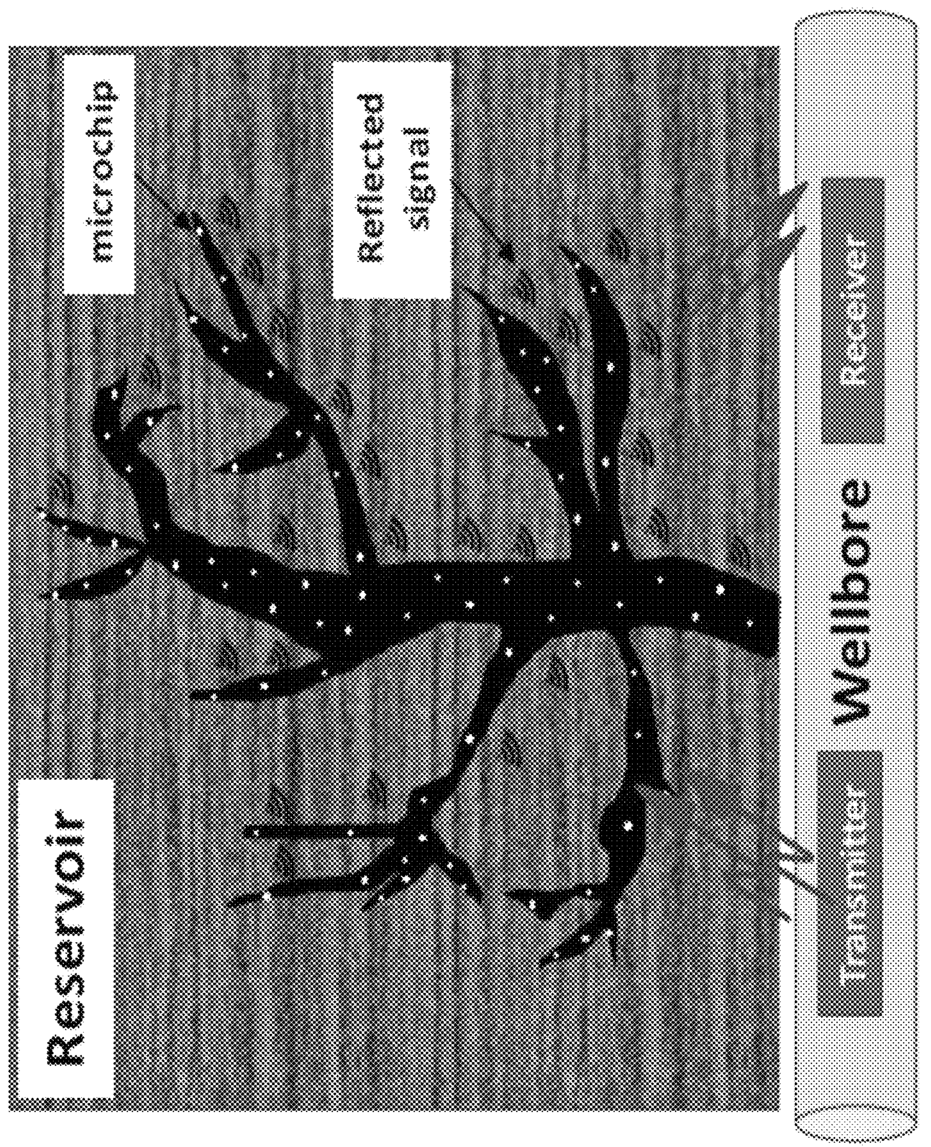
FIG. 2 illustrates a downhole tool used to provide wireless power to miniaturized chips and to receive reflected data back from microchips to provide a map of a hydraulic fracture in accordance with an embodiment of the invention.

As shown in FIG. 2, a WSN system can be utilized to reduce overall costs and can improve sensor density which can be used in large quantities in order to provide a map of a hydraulic fracture. A swam of microchips can be mixed with propellants and can be sent into the fractures during hydraulic fracturing. As illustrated in FIG. 2, a downhole tool can be used to provide wireless power to miniaturized chips and to receive reflected data back from the microchips. The downhole tool can be moved in a wellbore and the measurements can be repeated, thereby enabling a calculation of location of the microchips thus enabling performance of the fracture mapping by adoption of proper localization processes. One of the parameters that can determine the localization accuracy is signal-to-noise (SNR) ratio of the received signals. The signal radiated from a single microchip can be weak, which could limit the operating distance of a microchip and the efficacy of the localization processes. Systems and methods for coherent radiation from a swarm of wirelessly powered and synchronized sensor nodes can increase the operating range of the sensing nodes by forming a synchronized array of microchips that can collectively produce strong coherent radiation back to the downhole tool.

In many embodiments, specific objectives may need to localize and/or activate only a subset of the microchips in a particular location. For example, if only a certain portion of a fracking location is of interest, only those chips within that particular location can be activated. In many embodiments, a machine learning algorithm can be utilized that can identify a particular swarm response signal signature that should be received for a particular objective. For example, if a fracture is at 30 degrees from a wellbore and the microchips are in random locations at random orientations, the training algorithm can be used to determine the signature of the swarm signal that should be received for the particular objective. The training algorithm can identify what should be expected based on different measurements, including ramping up the transmitter amplitude, moving the location of the transmitter/receiver, and/or using a frequency sweep.

While specific systems and methods for coherent radiation from a swarm of wirelessly powered and synchronized sensor nodes are described above with regards to FIG. 2, any of a variety of different configurations of systems and methods for coherent radiation from a swarm of wirelessly powered and synchronized sensor nodes can be utilized including using any number of readers and/or utilizing readers that include multiple antennas and/or phased antenna arrays. Localization methods are disclosed further below.

Localization Methods

In many embodiments, systems and methods for coherent radiation from a swarm of wirelessly powered and synchronized sensor nodes can be utilized to estimate location of distributed sensors in a WSN system. In various embodiments, WSN localization techniques can be adopted to estimate position of sensors in the premises based on detection of direction of arrival (DOA), time of flight (TOF), and/or received signal strength (RSS).

In various embodiments, WSN localization techniques can be adopted to estimate position of sensors in the premises based on detection of direction of arrival (DOA), time of flight (TOF), and/or received signal strength (RSS). In certain embodiments, a Multiple Signal Classification (MUSIC) process can be utilized for estimating the DOA in array signal processing. Music can be used to estimate the DoA and is a powerful tool for processing the received signals radiated from different signal sources in order to extract the intended signal in the presence of interference and noise. In principal, MUSIC may rely on the received phase over an array of antennas to detect the DoA. Thus, the detection resolution may depend on the number of elements in the antenna array. Besides, the positioning accuracy of phase-based location techniques can be enhanced by repeating the experiment at multiple frequencies to alleviate the effect of multi-path reflection. The operating frequency alters the path loss and antenna efficiency. Hence, an optimal selection of the frequency results in the maximum received SNR and enhances the accuracy, consequently.

In the MUSIC based localization process, measured signal by an N-element antenna array can be considered as a vector in N-dimensional space. The N-element vector can be used to form a correlation matrix that can be used for estimating spatial spectrum of the received signals. In several embodiments, the MUSIC based localization process can be utilized to detect M independent signal sources (M being less than N), by using an eigen-decomposition technique on the correlation matrix which can result in estimation of the spatial spectrum. The spatial spectrum can represent the distribution of signal sources in every direction in space, thus resulting in DOA estimation. The MUSIC based localization process can also fit very well with fracture mapping applications as the antenna array can be swept along the wellbore to repeat the DOA estimation. In various embodiments, a uniform linear array (ULA) of antennas can be implemented as a synthetic aperture radar (SAR) with only two physical antennas. In several embodiments, utilizing a SAR architecture for antenna array significantly reduces the complexity of the transmitter in the wellbore. Those skilled in the art will understand that while a shortcoming of the MUSIC based localization process can be the large computational power required, this large computational power requirement is not a significant concern in fracture mapping applications.

While specific localization methods and/or antennas are described above, any of a variety of different localization methods and/or antennas can be utilized as appropriate to the requirements of specific applications in accordance with various embodiments of the invention.

Figure 3:
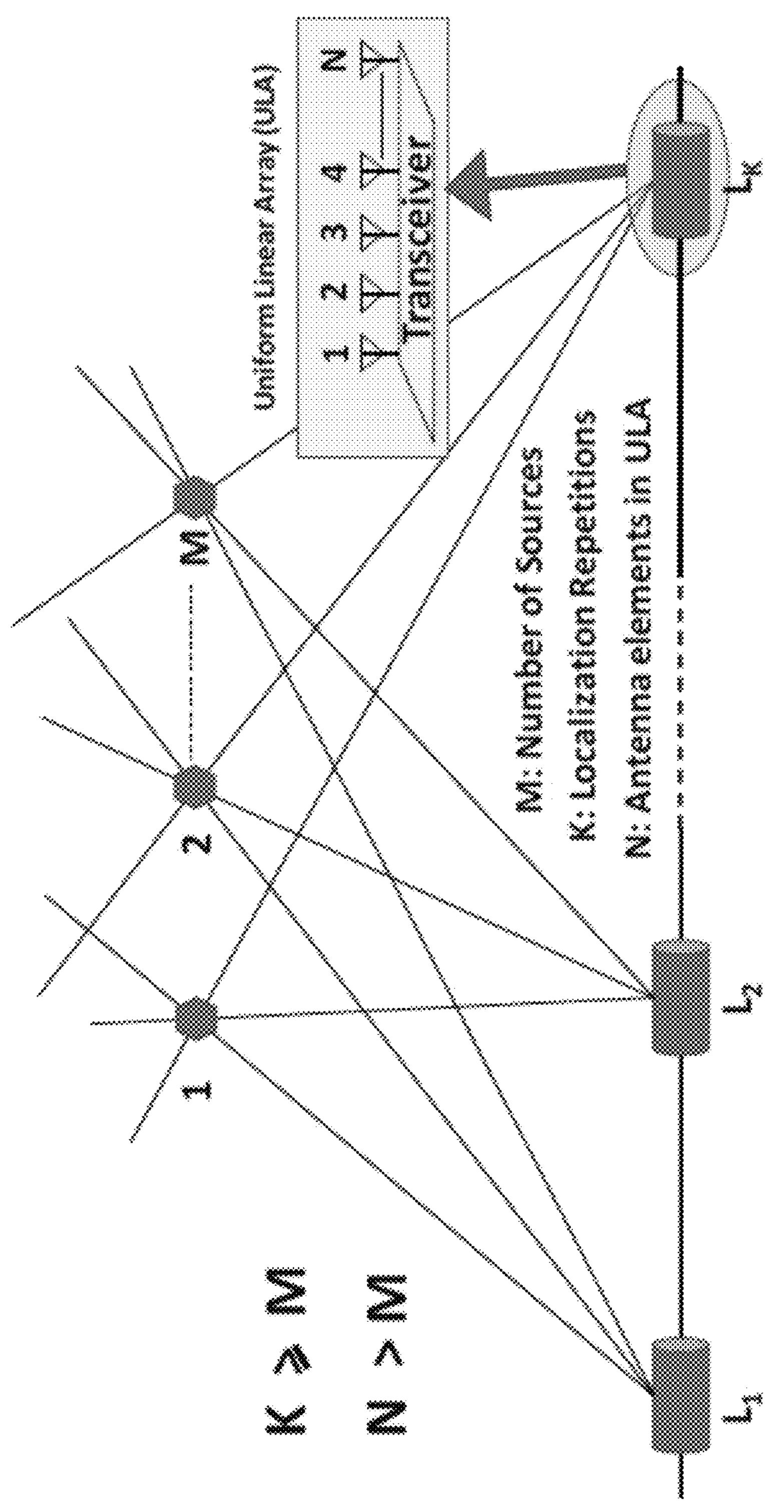
FIG. 3 illustrates multiple signal classification (MUSIC) localization process through multiple repetitions of direction of arrival (DOA) estimation in accordance with an embodiment of the invention.

In various embodiments, M independent signal sources can be uniquely positioned by repeating the DOA estimation M times and intersecting the connecting line from the center of the antenna array as illustrated in FIG. 3. Each hexagonal shape in FIG. 3 represents an independent signal source which is composed of several microchips forming a unified cluster. Aside from localization purposes, the microchips can also be equipped with additional circuitry to enable environmental parameter sensing (e.g., temperature, pressure, chemical properties, dielectric constant, among various other sensing capabilities). The maximum distance of microchips within a specific cluster is described below. Since the ULA is located at different distances to the clusters, the received signal from each cluster arrives with a different phase and the clusters can be considered as independent signal sources. Accordingly, multiple modified MUSIC processes are described to alleviate the challenges of correlated signal sources.

Figure 4:
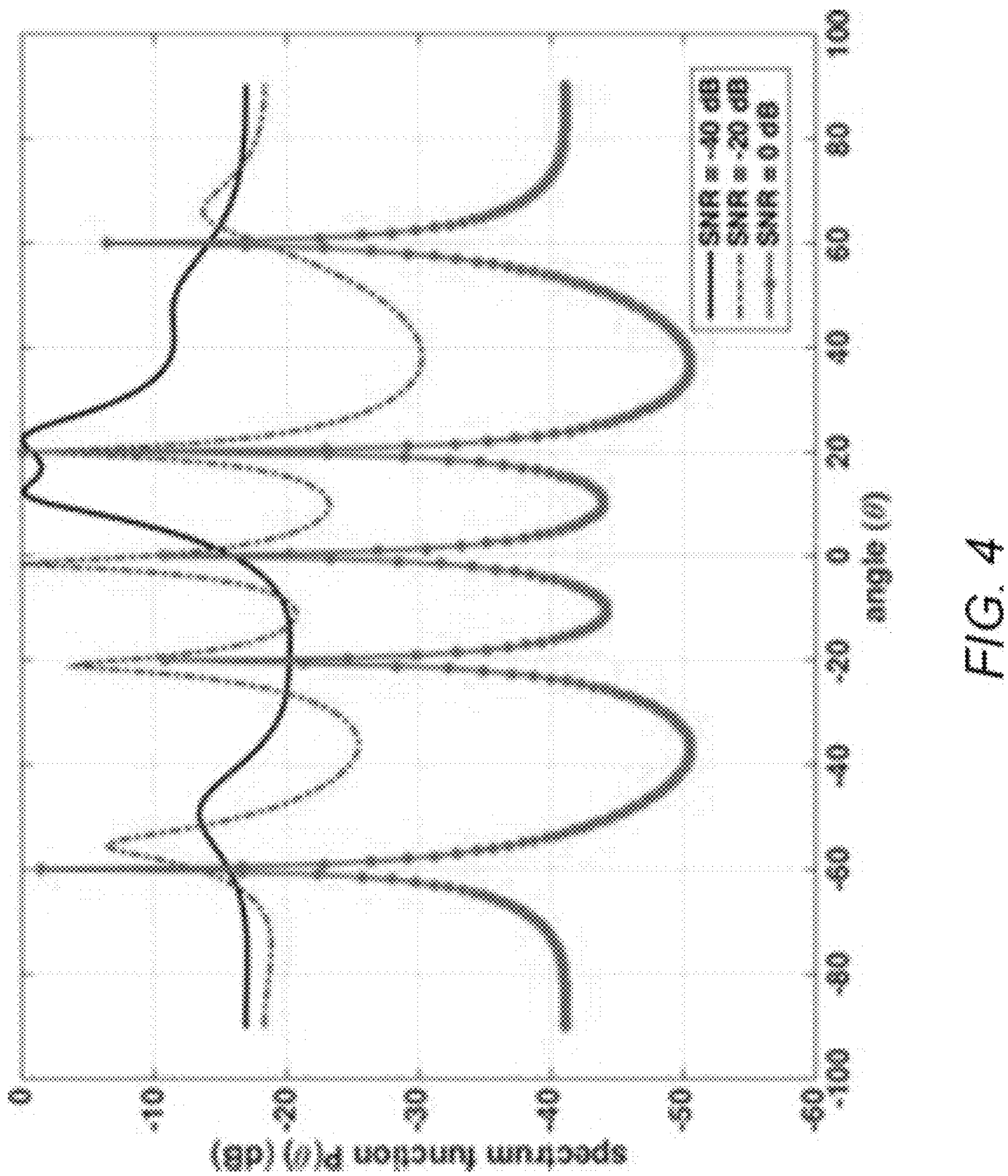
FIG. 4 illustrates effect of signal-to-noise ratio (SNR) of a received signal on performance of the MUSIC localization process in accordance with an embodiment of the invention.

In many embodiments, the resolution and the accuracy of the MUSIC based localization process can be highly impacted by the SNR ratio of the received signals. In certain embodiments, the estimated DOA for a six-element array when five nodes are uniformly distributed within −60° to −80° range with a step size of 20° can be plotted as is illustrated in FIG. 4. Note that the specific number for the range of angles can vary. As shown in FIG. 4, the importance of having a high SNR in a localization system is illustrated. Achieving an acceptable SNR value from a single wirelessly powered microchip is not feasible, thus embodiments of systems and methods for coherent radiation from a swarm of wirelessly powered and synchronized sensor nodes can be used to address this problem.

While specific localization processes are described above with respect to FIGS. 3-4, any of a variety of localization processes can be utilized as appropriate to the requirements of specific applications in accordance with various embodiments of the invention. System overview is disclosed further below.

System Overview

Figure 5A:
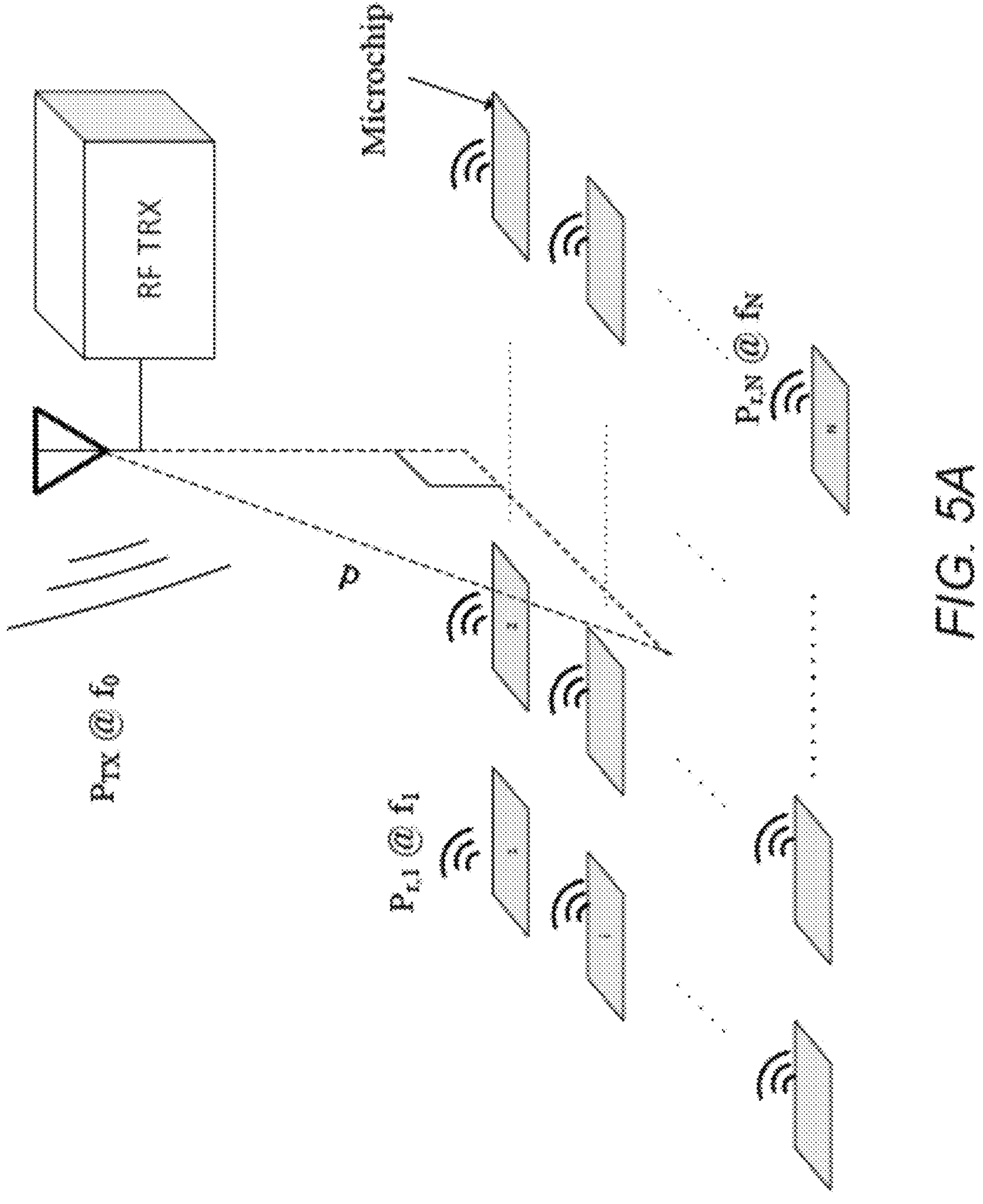
FIG. 5A illustrates a distributed wireless sensor network (WSN) based on mm-sized wirelessly powered microchips in accordance with an embodiment of the invention.

In several embodiments, systems and methods for coherent radiation from a swarm of wirelessly powered and synchronized sensor nodes can incorporate multiple mm-sized microchips as sensing nodes, fabricated (but not limited to) in a 180-nm CMOS SOI process. Each microchip can be equipped with a wireless power harvesting system and an on-chip oscillator. The overall system is illustrated in FIG. 5A in accordance with an embodiment of the invention. In the illustrated example, multiple microchips are used as individual nodes to form a distributed sensor network. The proposed network can be used for localization purposes by detecting the microchips that are placed in a sensing environment. In this localization technique, the reader can be placed in an operating region of a sensor node and can activate a node in its proximity. In many embodiments, the microchips can have certain activation thresholds that must be met in order for a chip to be activated.

The transmitted power from the reader ($P_{TX}$) can serve two important goals in the system. First, it can be the main source of power to activate the microchips. Second, it can be used as a reference signal to synchronize the reflected tones from all microchips. Upon activation, each node can reflect another RF signal back to the reader. The reader can scan the premises and can detect placement pattern by receiving signals from the nodes that are already placed in different spots. The total received signal at the reader can be a combination of each signal reflected from each node and can be formulated as:

$$V_{RX}(t)=\sum_{i=1}^{i=N}A_i\cos(2\pi f_{r,i}t+\phi_i) \tag{1}$$

where $A_i$, $f_{r,i}$, and $\varphi_i$ represent amplitude, frequency, and phase of the reflected signal from i-th element, respectively; and N is the total number of microchips. The frequency of the RF toned radiated back from the microchip can be precisely set to half of the power carrier frequency ($f_0$). Therefore, it can be assumed that the frequency of radiated signals from the microchip is set to $f_0/2$ in the presence of a power carrier at $f_0$. A group of adjacent nodes that are approximately at an equal distance from the reader can be considered as a unified cluster. Hence, the received signals from all sensor nodes within a cluster can arrive at the reader with the same phase. When a large number of microchips are placed in a cluster, they are aligned randomly and the received signal from each microchip at the reader depends on the microchip alignment. For simplifying the analysis and without loss of generality, it can be assumed that all the microchips are aligned with the reader antenna. Under these assumptions, the radiated signals from microchips with the same cluster will add up coherently and the received signal can be re-written as:

$$V_{RX}(t)=N\times A\cos(2\pi f_r t+\phi) \tag{2}$$

Eq. 2 implies that if all received signals are in-phase and have the same frequency, they add up constructively. As a result, the amplitude will be amplified by a factor of N and the received power is multiplied by $N^2$. Therefore, a distributed sensor network can resemble the behavior of a phased-array antenna. Radiated power from an individual element can be less than a milliwatt. This weak radiated signal can experience a relatively large attenuation due to path losses. As Eq. 2 suggests, the received power can be amplified by increasing the number of elements in the distributed sensor network if all nodes reflect an RF signal with the same frequency and phase. For example, with 1,000 coherent nodes the received power at the reader will be amplified by a factor of 1,000,000.

Figure 5B:
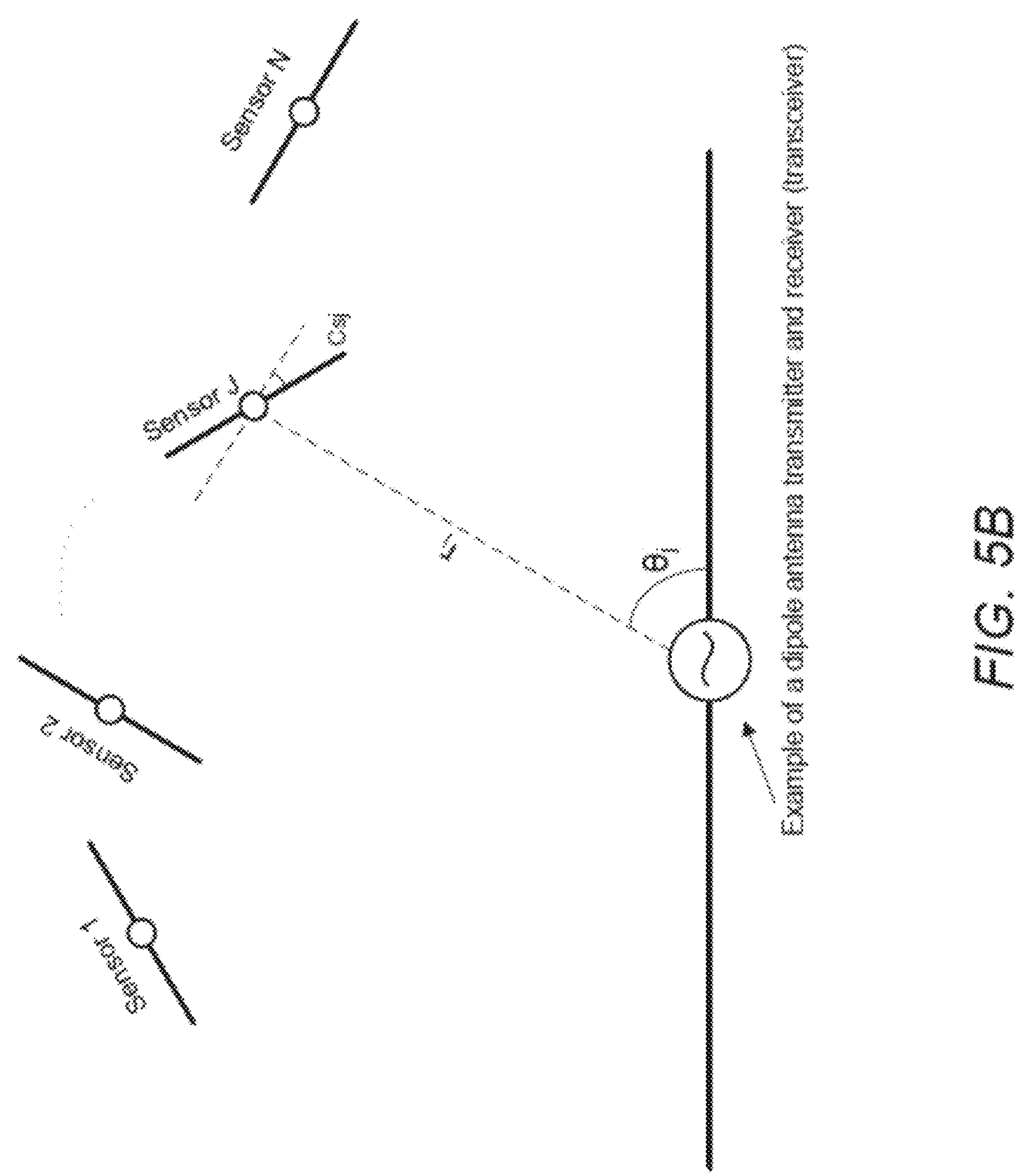
FIG. 5B illustrates a randomly distributed array in 3D space with microchip sensors having antennas with different orientations in accordance with an embodiment of the invention.
Figure 5C:
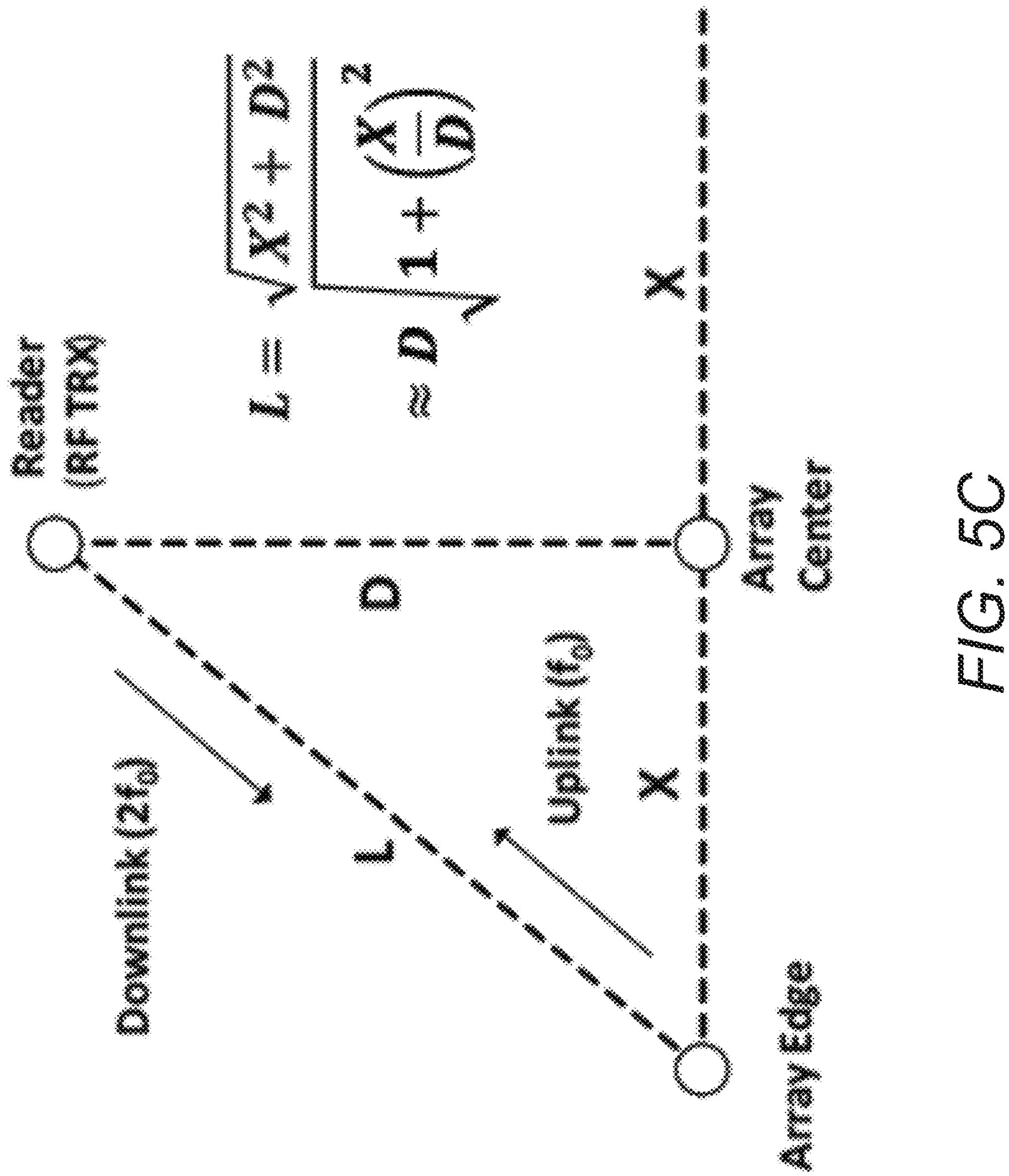
FIG. 5C illustrates a linear sensor array configuration in accordance with an embodiment of the invention.

To ensure the negligible phase shift assumption between the sensor nodes within a cluster, the maximum span of the array should be limited. To calculate the maximum array span, the maximum allowable phase shift can be defined in a linear array as the phase shift that results in a particular dB power loss (e.g., 3 dB power loss) in the combined power from the sensor at the center of the array and the sensor at the edge. A similar approach can be used for 2D and 3D arrays as well to calculate the maximum span. A configuration of a linear array in accordance with an embodiment of the invention is illustrated in FIG. 5C. With the defined metric, the maximum phase shift is calculated as 90 degrees according to the following equation:

$$\frac{\sqrt{A^2+A^2+2A^2\cos(\phi_{max})}}{2A}=\frac{\sqrt{2}}{2} \tag{3}$$

Considering that the reference signal can experience the same path difference in downlink at a frequency twice as the uplink, the maximum allowable phase difference should be limited to a particular number of degrees (e.g. 30 degrees) to satisfy (3).

The maximum array span (2×X) can be computed for a given wavelength (λ), maximum phase shift (φ max), and reader to array center spacing (D) according to the following equation:

$$X\leq\sqrt{\frac{\phi_{max}\times\lambda\times D}{180}} \tag{4}$$

In a number of embodiments, whether an individual microchip is powered up will depend upon the coupling between an RF transceiver and a microchip. A randomly distributed array in 3D space with the microchip sensors having antennas with different orientations is illustrated in FIG. 5B in accordance with an embodiment of the invention. As illustrated in FIG. 5B, the individual sensors that are activated are the ones that are strongly coupled with the RF transceiver, and based upon their strong coupling will constructively combine at the RF transceiver. In the illustrated example, multiple microchips are used accordingly, microchips that are likely to contribute destructively often fail to activate and the subset of microchips that are activated are likely to transmit in a manner that results in the signals received at the RF transceiver being coherent and in phase. As can readily be appreciated, when the sensors described herein are oriented randomly and/or in a non-uniform manner, due to coherent frequency and phase locking, the net signal received by the transceiver can be increased as the number of sensors increases. The orientation of the sensing microchips can determine whether they will be activated, and the sensing microchips that are weakly coupled can be the ones that may destructively interfere.

While specific system overview is described above with respect to FIGS. 5A-C, any of a variety of system overviews can be utilized as appropriate to the requirements of specific applications in accordance with various embodiments of the invention. Microchip design and implementation is disclosed further below.

Microchip Designs and Implementations

Figure 6:
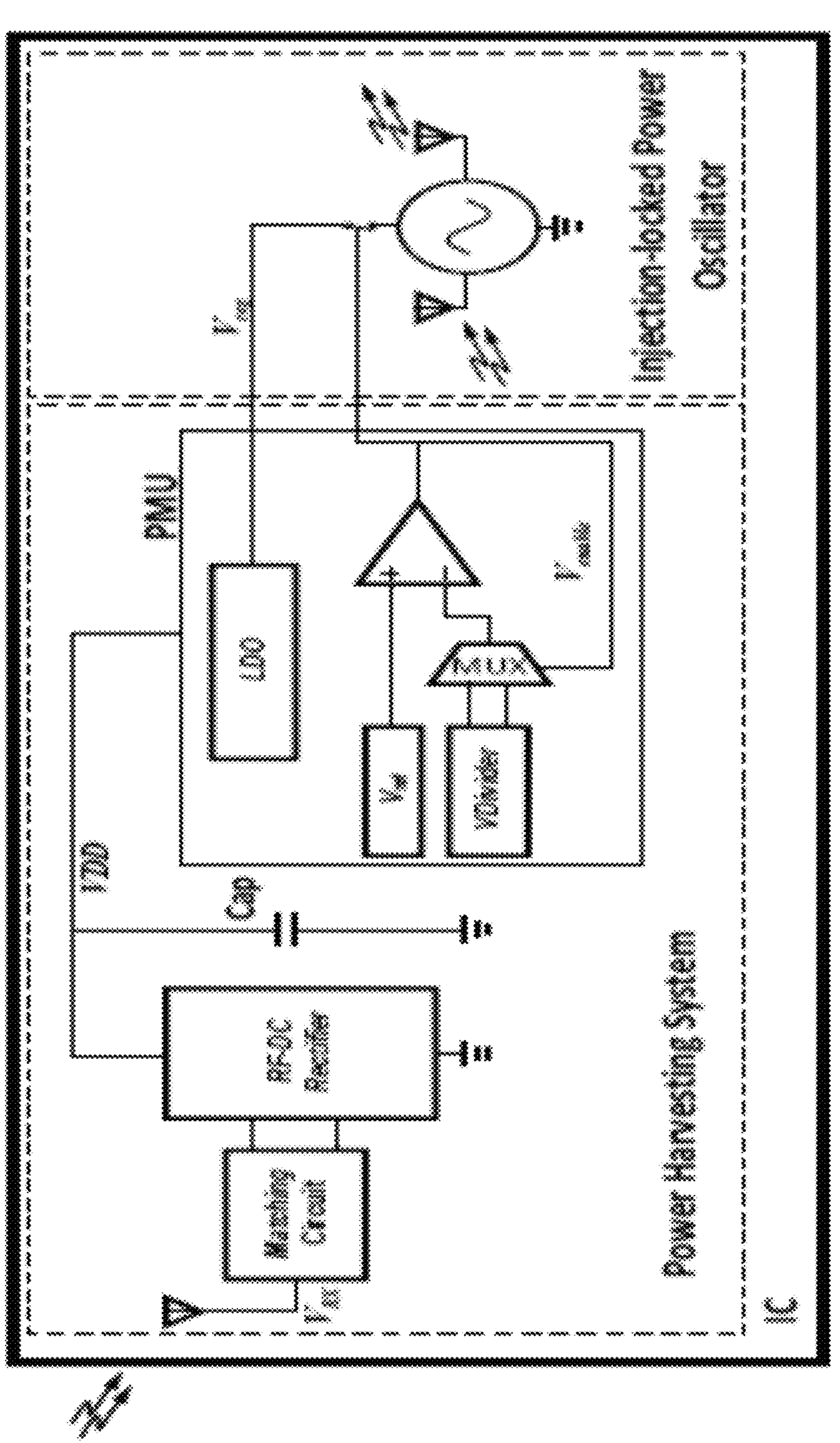
FIG. 6 illustrates a circuit block diagram of an integrated microchip used as an individual node in a distributed sensor network in accordance with an embodiment of the invention.
Figure 7:
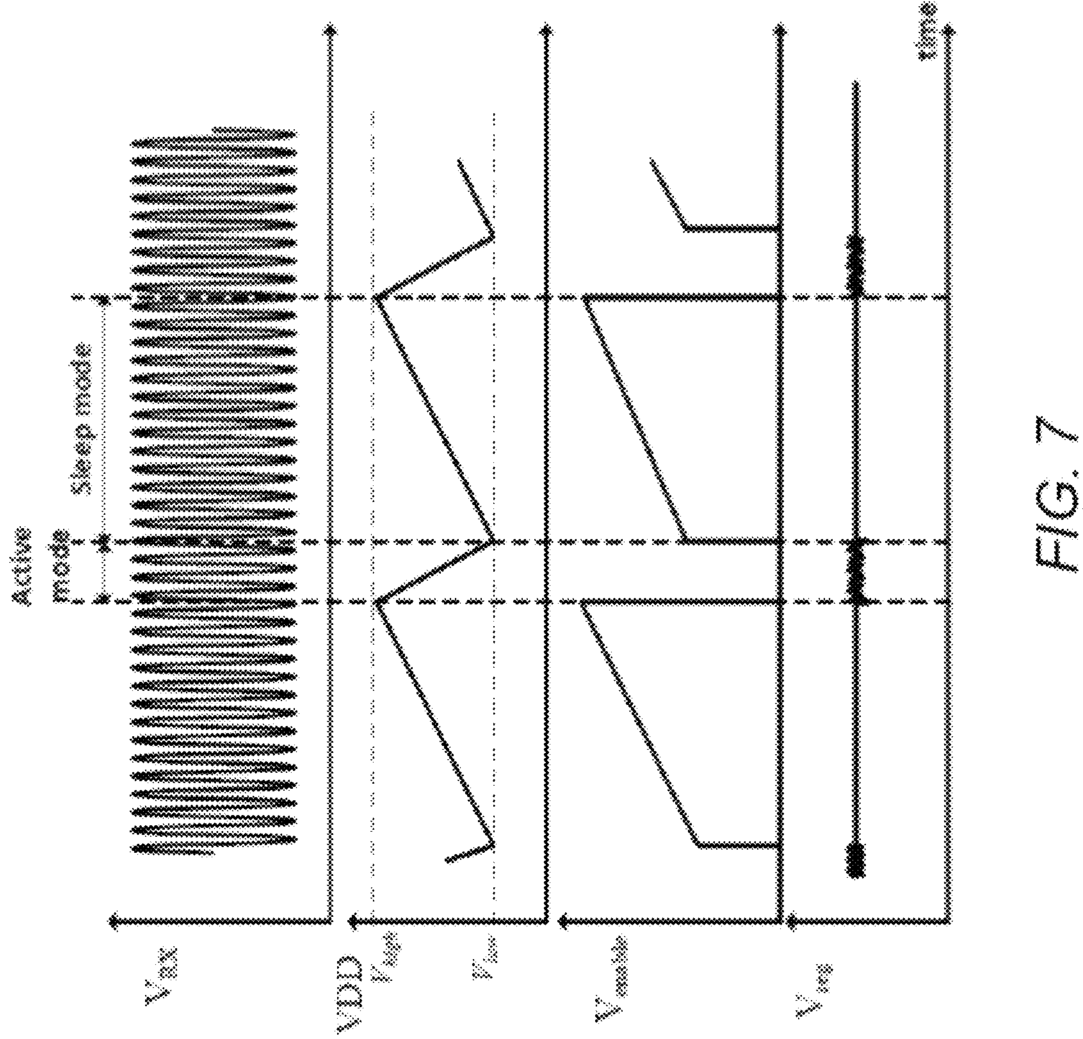
FIG. 7 illustrates transient timing diagram of internal nodes in a power harvesting system during active and sleep modes in accordance with an embodiment of the invention.

In many embodiments, a microchip can be implemented that can be compatible with power budget requirements of a wirelessly powered system. A circuit block diagram of the microchip is illustrated in FIG. 6 in accordance with an embodiment of the invention. In the illustrated example, three on-chip dipole antennas can be incorporated onto the microchip. One antenna can be used for receiving RF energy from an external reader. The incoming RF wave can also be fed into another antenna in order to enable sub-harmonic injection locking. The third antenna can be used to transmit reflected signal from the microchip back to the reader. The microchip can include a power harvesting system to enable wireless power transfer and battery-less operation. Harvested power is often less than the instantaneous power consumption of the incorporated circuitry in the microchip. A power management unit (PMU) can be included in the power harvesting system to duty-cycle the operation of communication circuits in order to lower the overall power consumption. The transient voltages of the PMU are shown in FIG. 7. As shown in the FIG. 7, the PMU can have sleep and active operational modes.

In certain embodiments, the power delivery antenna can be modeled with the silicon substrate and simulated in IE3D simulation software (Mentor Graphics, Wilsonville, Oregon). The received power by the microchip can be formulated according to the Friis equation and is expressed in equation (5).

$$P_{RX} = \frac{P_{TX} \times G_{TX} \times G_{RX} \times \lambda^2}{(4\pi d)^2} \tag{5}$$

Simulated results show that for a 1 W Equivalent Isotropically Radiated Power (EIRP) transmitted power level and a spacing of 5 cm, about 800 μW is received by the on-chip dipole antenna at 8 GHz. Hence, operating frequency for power transmission is chosen to be around 8 GHz to maximize the link efficiency. Note that the specific number for power levels, distance and frequency values can vary.

Figure 8:
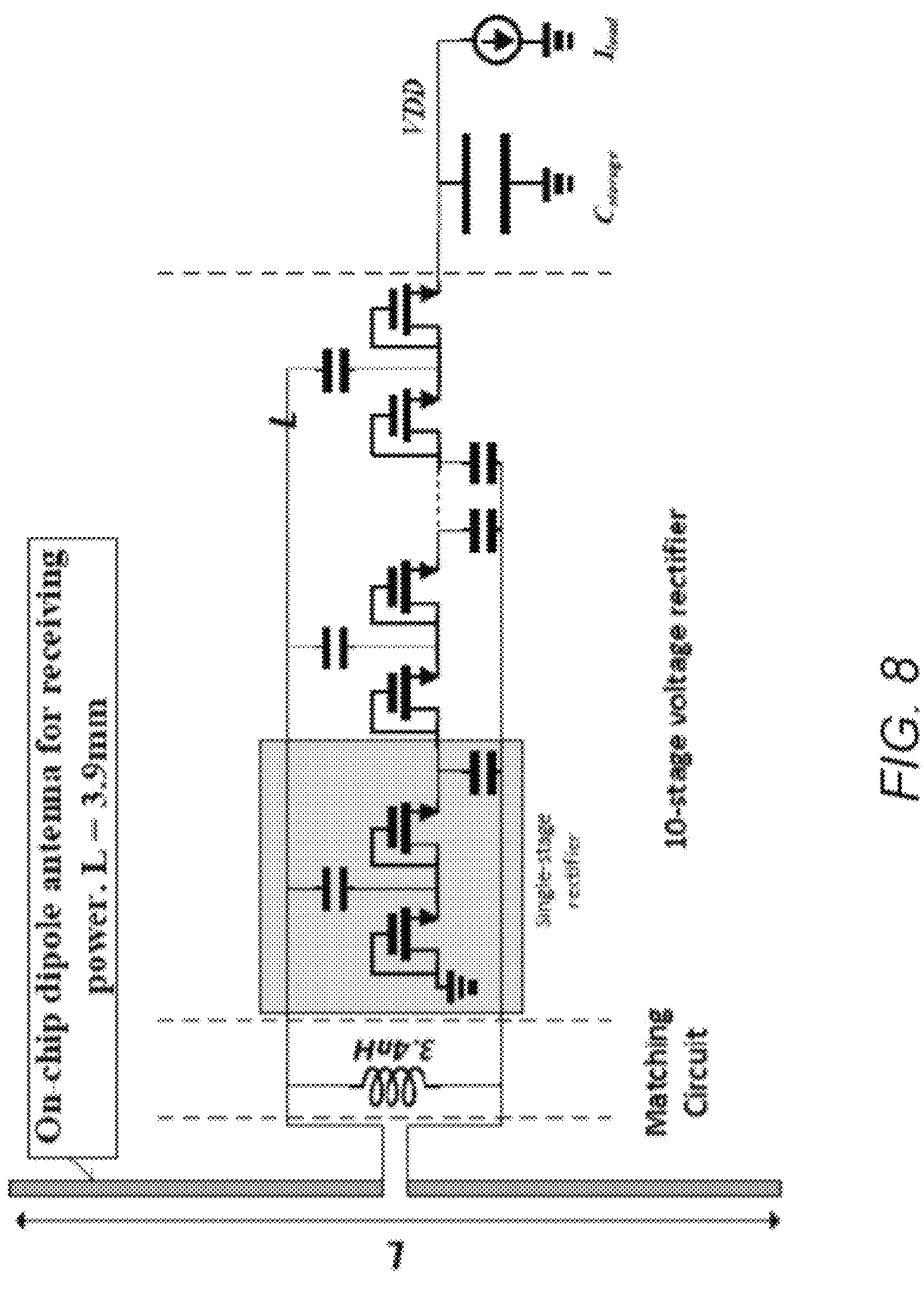
FIG. 8 provides a circuit diagram of a 10-stage voltage rectifier connected to an on-chip dipole antenna with a matching circuit in accordance with an embodiment of the invention.

The on-chip dipole antenna can be matched using a 3.4 nH inductor that resonates with the antenna's impedance. A multi-stage voltage rectifier follows the antenna in order to convert sinusoidal signals to a dc voltage, as illustrated in FIG. 8. The minimum power needed for the voltage rectifier to generate a 1 V output dc voltage across the capacitor can be −16.1 dBm. The rectifier output voltage can have many high-frequency ripples and can vary with different loads. A low-dropout voltage regulator (LDO) can follow the rectifier in order to generate a stable dc voltage for the data communication circuitry.

Figure 9:
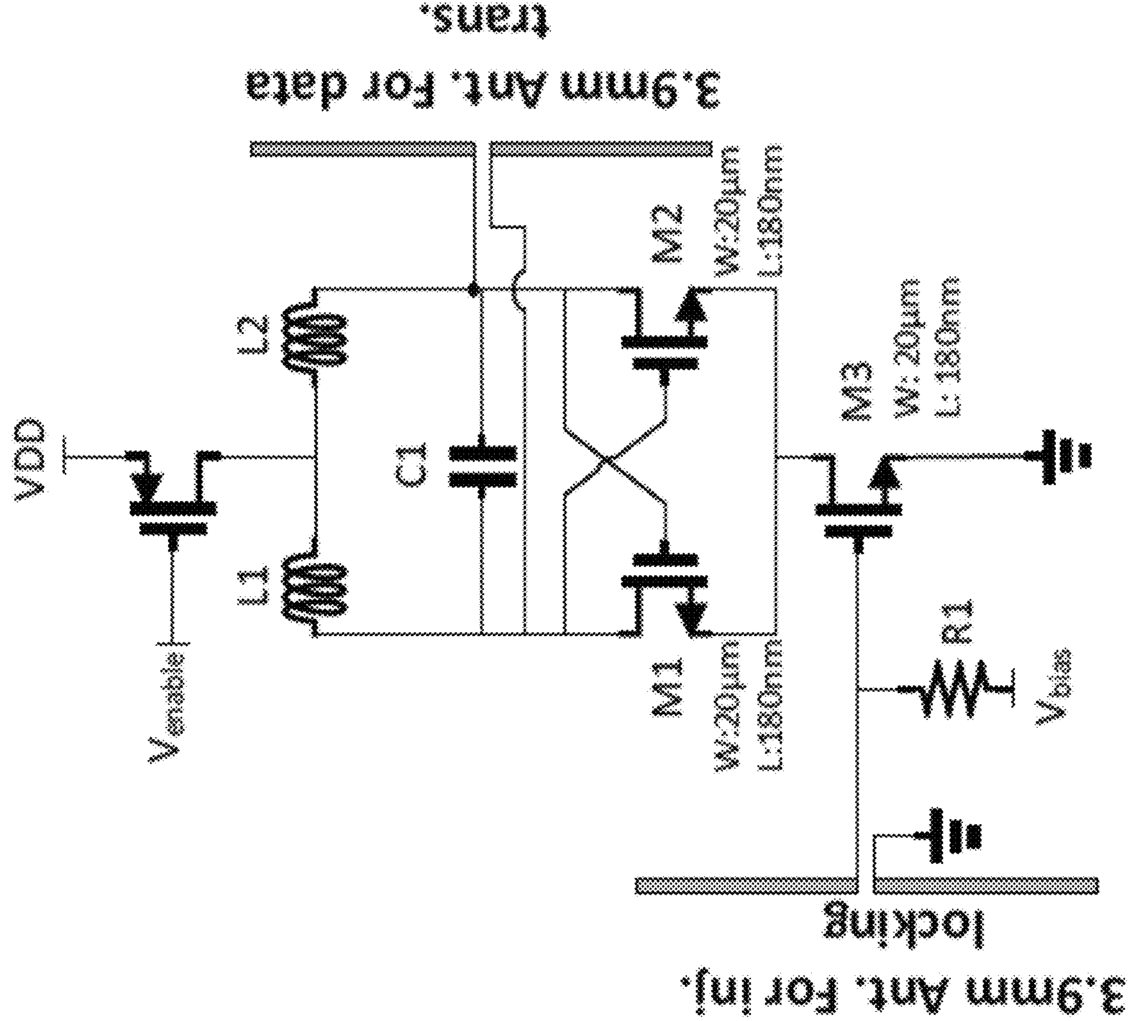
FIG. 9 provides a circuit diagram of an injection-locked VCO in accordance with an embodiment of the invention.

In various embodiments, signal reflection can be carried by a transmitter block which can be implemented based on a power oscillator (PO) architecture where a voltage-controlled oscillator (VCO) can be directly connected to the antenna. A PO-based transmitter does not need additional power-hungry circuitry such as a power amplifier or a buffer and can result in decreased power consumption. The circuit schematic of the injection-locked VCO is illustrated in FIG. 9 in accordance with an embodiment of the invention. As shown in FIG. 9, the VCO can be implemented using a cross-coupled pair of NMOS devices and the operating frequency can be determined by the resonance frequency of the LC tank. However, due to fabrication process and temperature variations, the operating frequency may drift. In addition, the phase of the output signal can be ambiguous, which can result in the reflected signals having different phase and frequencies, and not adding up constructively. The operating frequency of the VCO can be stabilized in order to address this issue.

In many embodiments, sub-harmonic injection locking can be utilized in order to achieve synchronized reflected signals. The transmitted power from the reader can be utilized as a reference signal for injection-locking. The reference signal can be picked up by another dipole antenna and can be fed into the tail current source of the VCO as illustrated in FIG. 9. Feeding the signal to the tail current source can set the operating frequency of the VCO to half of the injection frequency ($f_0$). The locking range of the VCO can depend on the input power level of the fed signal and the quality factor (Q) of the inductor. As the Q-factor increases, the locking range can become smaller and a higher input power level can expand the locking range. Simulated locking range for a moderate Q-factor of 12 and an input power level of 8 dBm indicates a locking range of 4-5 GHz. Note that the specific number for Q-factor, power level and frequency values can vary.

While specific microchip design and implementation are described above with respect to FIGS. 6-9, any of a variety of microchip design and implementation can be utilized as appropriate to the requirements of specific applications in accordance with various embodiments of the invention. Experimental results are disclosed further below.

Experimental Results

Figure 10A:
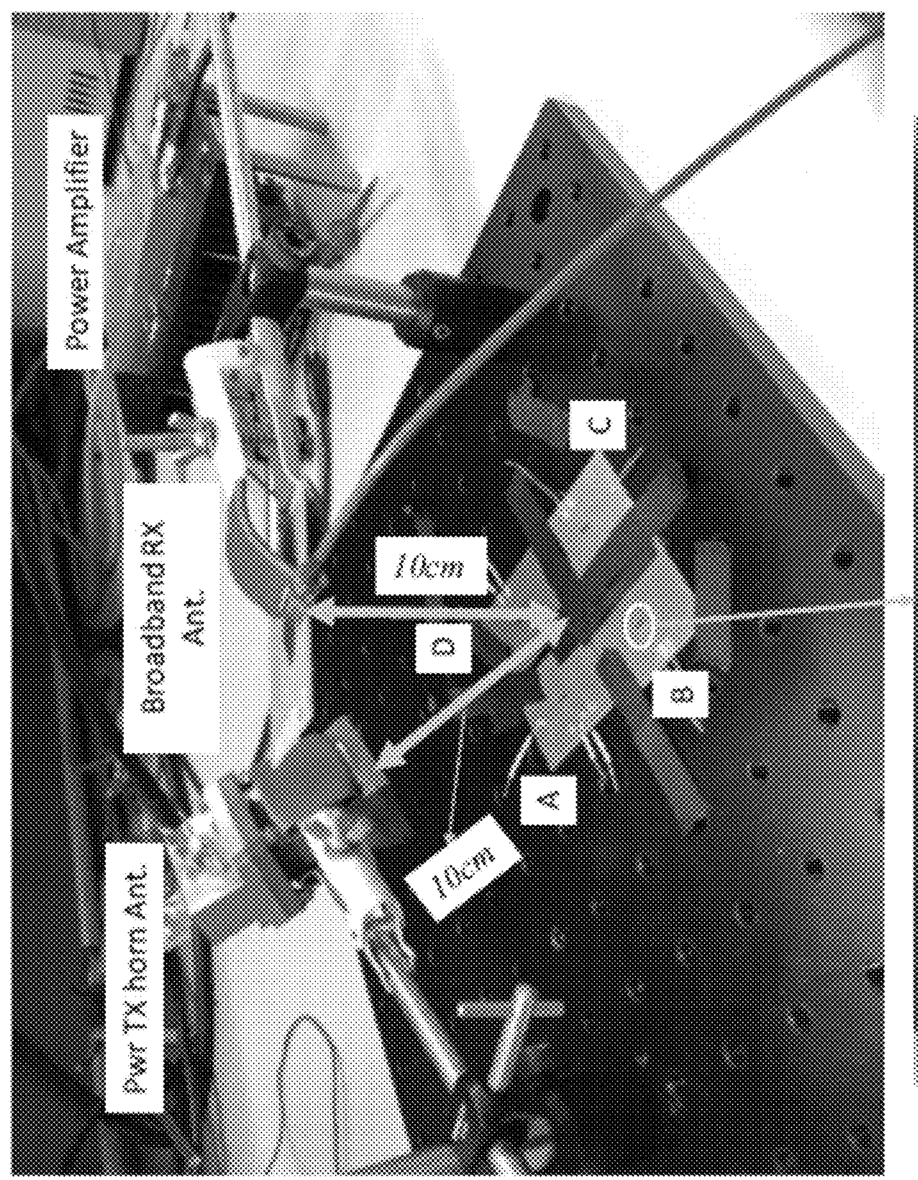
FIG. 10A provides a photograph an experimental setup for evaluating performance of a distributed sensor network in accordance with an embodiment of the invention.
Figure 10B:
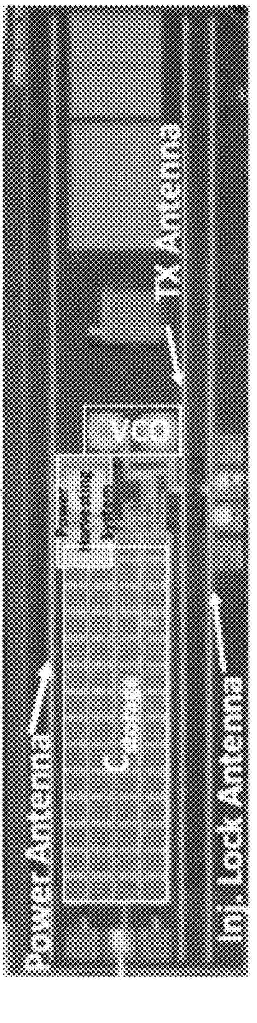
FIG. 10B provides a photograph of a fabricated microchip in accordance with an embodiment of the invention.

An experimental coherent distributed sensor network setup is demonstrated using a 2×2 array of microchips as shown in FIG. 10A in accordance with an embodiment of the invention. The total area of each microchip, fabricated in 180-nm CMOS SOI process, is 3.9×0.7 mm$^2$, which includes three on-chip antennas that are used for power delivery, injection locking, and transmission of a reflected RF tone, respectively. Note that the specific numbers for the numbers in the array and the value for the chip area can vary. A micrograph of a fabricated microchip is shown in FIG. 10B in accordance with an embodiment of the invention. An E8257D Keysight (Santa Rosa, CA) signal generator is used as a source to generate an RF signal at a desired frequency. In order to extend the operating range, the RF signal is passed through a power amplifier (RF-Lambda 0218G5; San Diego, CA) and is followed by a horn antenna with directivity of 10 dBi. The horn antenna can radiate a focused beam that can be used for power delivery and for synchronization of reflected RF tones from all microchips. Note that the specific number for power level can vary. Wireless power transmission test is disclosed further below.

A. Wireless Power Transmission Test

Figures 11A, 11B:
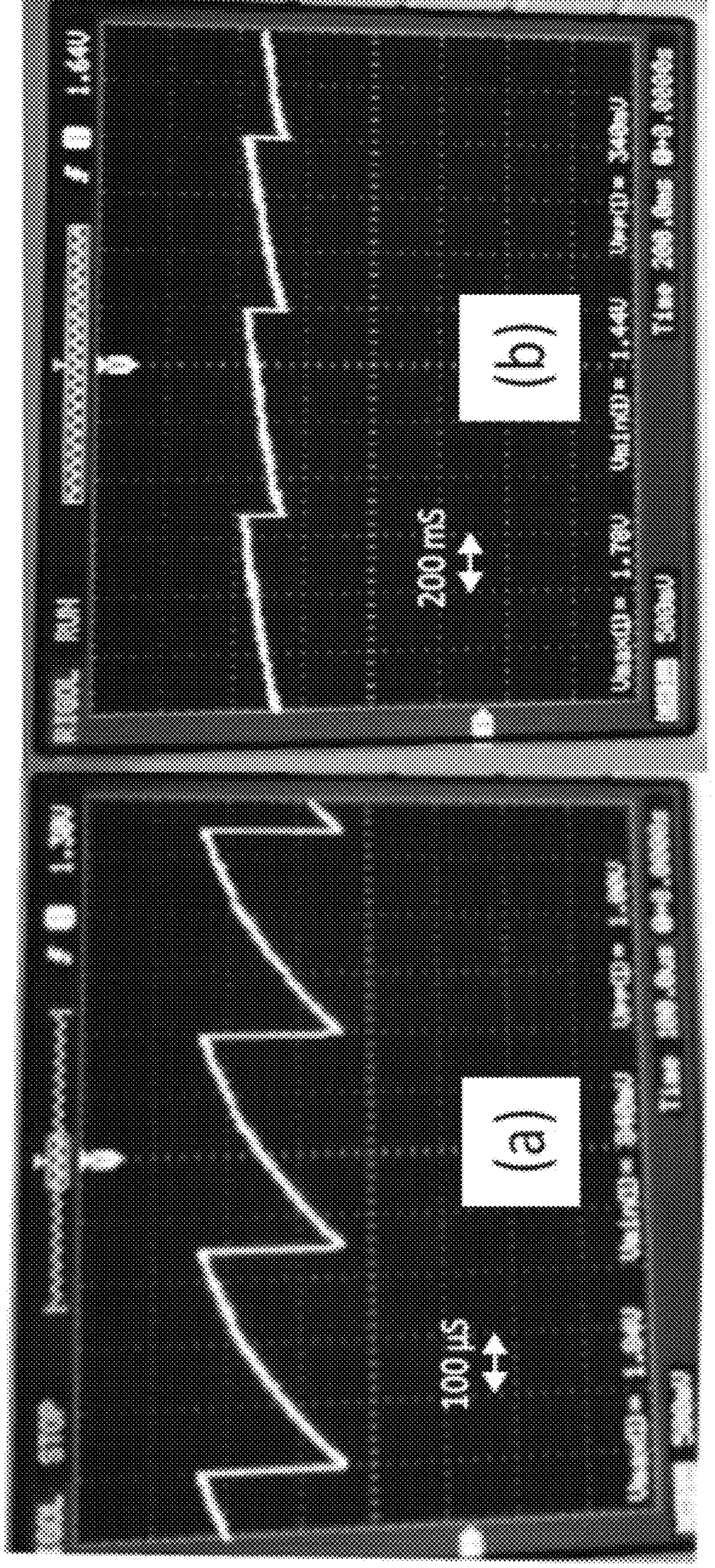
FIG. 11A provides a graph of measured voltage as a function of time from an output node of a voltage rectifier for $C_{storage}$=1.1 nF in accordance with an embodiment of the invention.
FIG. 11B provides a graph of measured voltage as a function of time from an output node of the voltage rectifier for $C_{storage}$=1.0 uF.

In several embodiments, performance of the wireless power harvesting system can be evaluated for different values of transmitted power levels ($P_{TX}$) from a horn antenna. Measured voltage waveform at VDD node of a single microchip without any external component is plotted in FIG. 11A. The horn antenna is placed 10 cm away from the microchip and transmits a +30 dBm power carrier at 7.68 GHz. As shown in FIG. 11A, the storage capacitor is charged and discharges with a frequency of 30 kHz and the discharging time lasts only for 10 μS. In order to extend the active time of the VCO, an external 1 μF shunt capacitor is placed in parallel with the $C_{storage}$. For a given current that is withdrawn ($I_0$) from the storage capacitor during the discharging phase, the discharging time can be expressed as:

$$t_{discharge} = (V_H - V_L) \times \frac{C_{storage}}{I_0} \tag{4}$$

Repeating the same experiment with a 1 μF shunt capacitor indicates that the charging time and discharging time are scaled proportionally. The measured waveform is shown in FIG. 11B. Note that the specific numbers for power level, distance, capacitance and frequency values can vary. Coherent power combining is disclosed further below.

B. Coherent Power Combining

In accordance with an embodiment of the invention, four microchips can be used that are locked to the frequency of a reference signal as illustrated in FIG. 10A. As shown in FIG. 10A, a custom designed broadband antenna is placed at 10 cm distance from the center of the array to receive radiated tones from the microchips. The broadband antenna is implemented as a planar inverted cone antenna (PICA) and archives a bandwidth of 3-10 GHz. The microchips are capable of being wirelessly powered which results in a duty-cycled operation. When the chips are locked to the same power carrier signal, the reflected signals add up constructively. The constructive power combination of synchronized microchips can be characterized in the frequency domain by investigating the frequency spectrum of the received signals. The duty-cycling behavior can be considered as mixing the sinusoidal output of a VCO with a periodic pulse train. Thus, the spectrum of the received signal can be a modulated version of the actual transmitted signal. In many embodiments, the VCOs can be utilized in a duty-cycled operation fashion. To accurately measure the frequency and strength of the reflected signals, a dc power supply (a 1.3 V supply voltage connected to Vreg node of each microchip) can be used to power up the microchips while they operate continuously. Note that the specific numbers for distance, voltage and frequency values can vary.

Figure 12A:
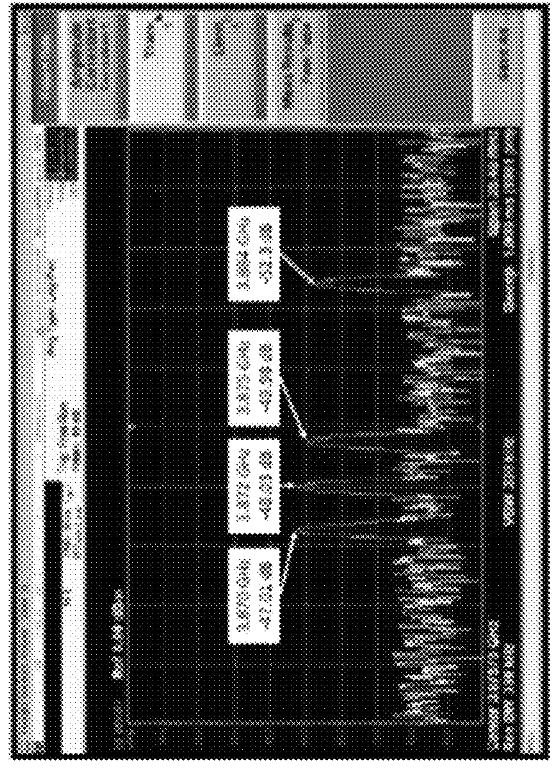
FIG. 12A provides a graph of measured spectrum of radiated signal from four microchips in absence of a power carrier in accordance with an embodiment of the invention.
Figure 12B:
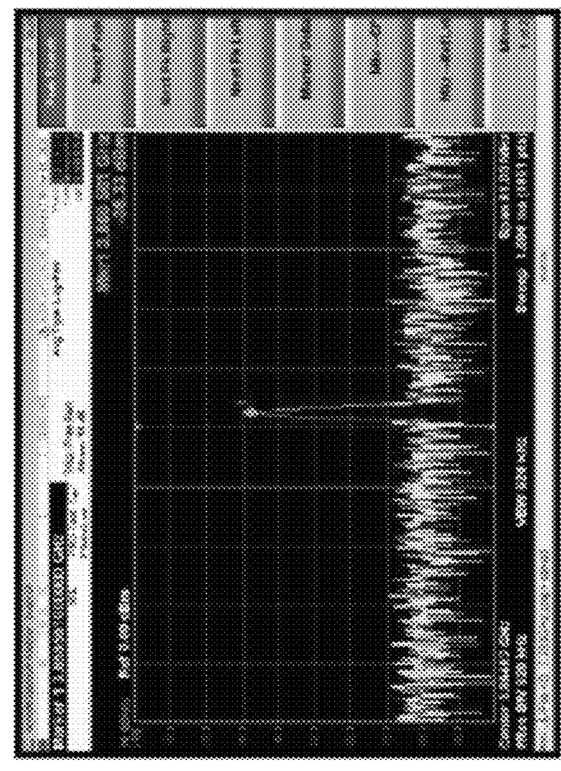
FIG. 12B provides a graph of measured spectrum of radiated signal from four microchips in presence of a 7.733 GHz power carrier in accordance with an embodiment of the invention.

In various embodiments, the free-running frequency of the VCOs can be measured and the synchronization through injection-locking of VCOs can be verified by a setup of measurement and characterization in the frequency domain. A Keysight spectrum analyzer E4440A can be utilized to process the received signal by the broadband antenna. The received spectrum has been compared in two different scenarios in order to observe the effect of injection locking. First, the VCOs are operating in free-running mode and there is no power carrier signal to lock the microchips. The received spectrum is shown in FIG. 12A where four different tones with different frequencies and different power levels can be spotted. In the second case, an RF signal with a power level of +22 dBm is delivered to the horn antenna at 7.733 GHz. As shown in FIG. 12B, in the presence of a master signal, all the VCOs are synchronized and the operating frequency is set to 3.866 GHz, which is half of the carrier frequency. In addition, the received signal strength is boosted to −35.33 dBm which verifies the idea of power amplification through a constructive summation of radiated signals from a distributed sensor network. Note that the specific numbers for power level and frequency values can vary.

In various embodiments, the LC tank of the VCOs can be designed with a moderate Q-factor to expand the locking range. The locking range of each microchip can be measured by sweeping the frequency of the RF source. The locking range of each of the microchips A, B, C, and D is measured using the same measurement setup as shown in FIG. 10A. The measured results show that the locking ranges of all the microchips overlap in a frequency range of 7.72-7.79 GHz. It should be noted that the locking range of a single microchip could be expanded by increasing the transmitted power level or decreasing the distance between the horn antenna and the array. Note that the specific numbers for frequency values can vary.

Figure 13:
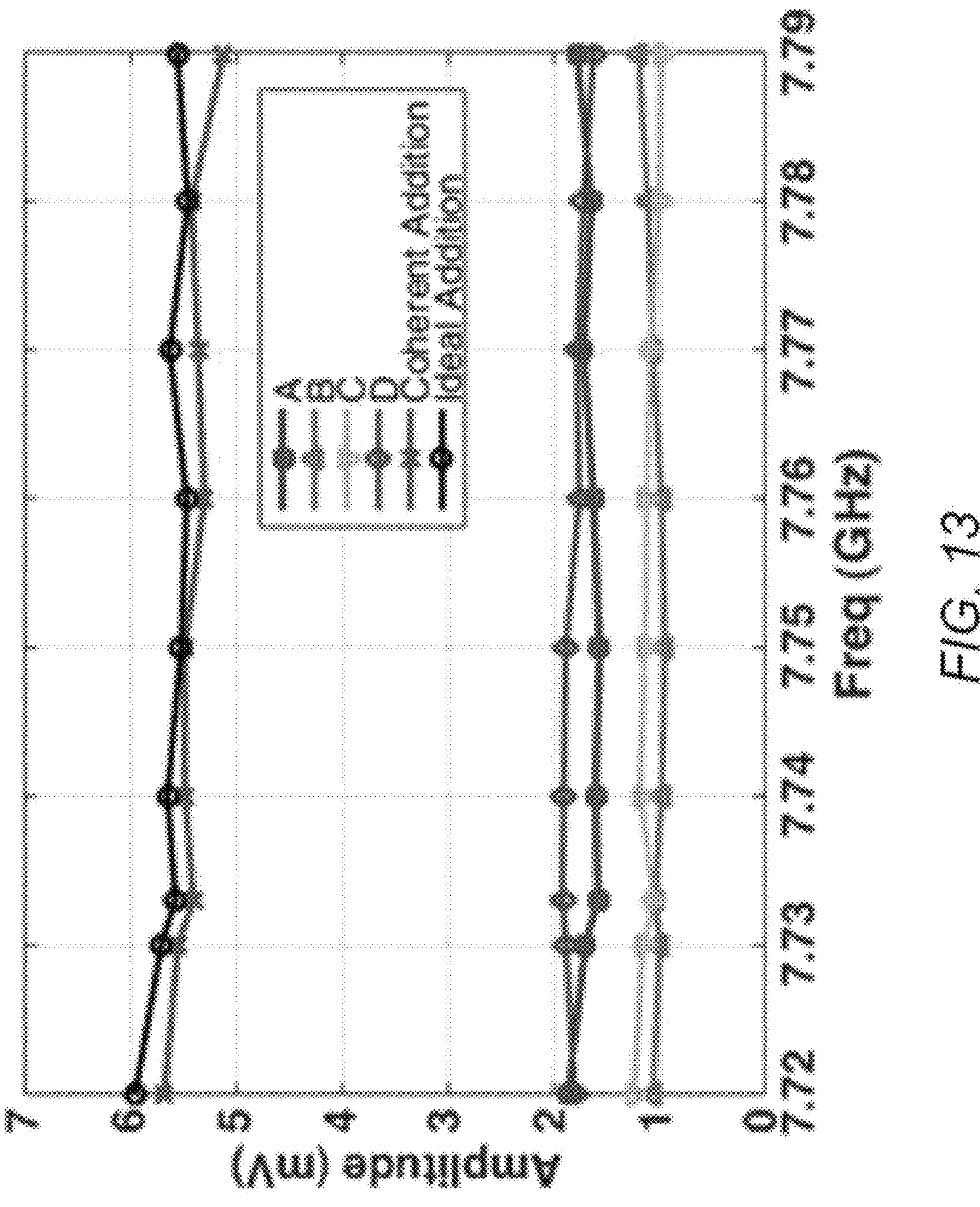
FIG. 13 provides a graph of calculated received signal amplitude versus frequency for the microchip array of FIG. 10A with varying values for active elements.

In many embodiments, the frequency of the reference signal can be swept in the boundaries of the locking range in order to evaluate the performance of the system at different frequencies. The received signal from a single injection-locked microchip can be recorded. Based on the power level, the amplitude of the received signal is calculated as illustrated in FIG. 13. Finally, all the microchips (A, B, C and D shown in FIG. 10A) can be activated at the same time which can result in a coherent summation of the received signals. The experiment can be repeated for coherent addition case and the results are plotted in FIG. 13. As shown in FIG. 13, the resulting amplitude from coherent injection-locked microchips (A, B, C, D) is very close to the algebraic summation of all the amplitudes. A method for training a neural network is disclosed further below.

Figure 14:
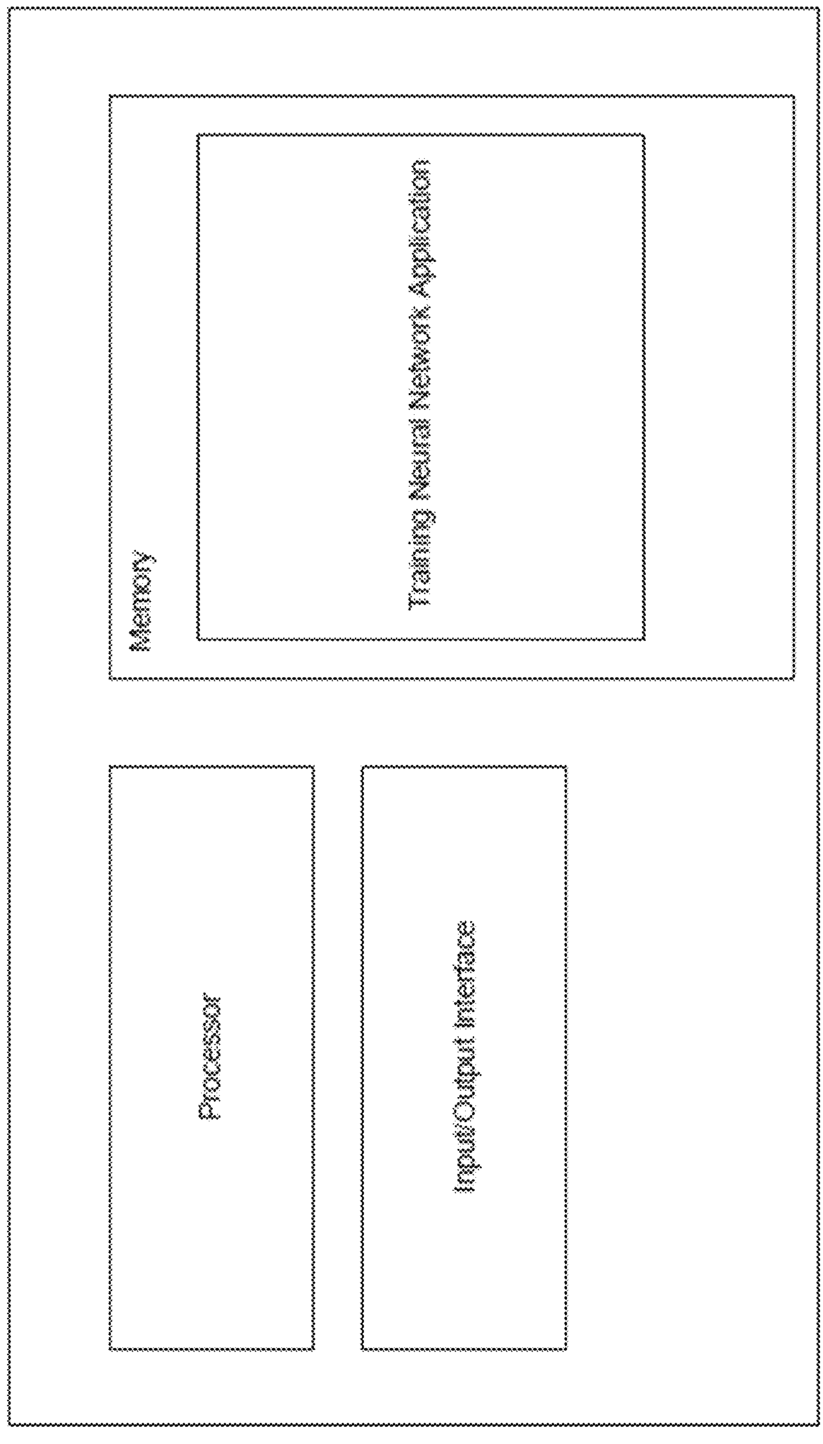
FIG. 14 provides a block diagram of a system for implementing a neural network application in accordance with an embodiment of the invention.

In many embodiments systems and methods for coherent radiation from a swarm of wirelessly powered and synchronized sensor nodes include a processor and a memory containing an algorithm for training a nueral netwrok, as illustarted in FIG. 14. In many embodiments, the machine learning algorithm can provide a black box measurement tool whereby different SWARM response signatures can be identified for partiuclar objectives. For example, if a certain set of microchips are of interest within a particualr location, the traning algorithm can identify the particualr SWARM response signal signature that should be received accordingly. Furthermore, for certain objectives, only a subset of the microchips may need to be activiated or of interest, and the particualr response signal signature can be determined using machine learing.

An example of a code for training a nural netwrok is shown below:

```
% This code is written to generate data for traing a Neural Network Model
clear;
for iter=1:10   % repeart data generation for multiple iterations
N=20;      % Numer of Sensor Nodes
%x=10*rand(1,N);
%y=10*rand(1,N);
%%%%%% For each itertation, start point and end point are randomly
%%%%%% initilized and N sensor nodes are placed between start pont and end
%%%%%% point uniformly
x1=10*rand(1);
x2=10*rand(1);
xstart=x1;
xend=x2;
x=(1:N)/N*(xend−xstart)+xstart;
y1=10*rand(1);
y2=10*rand(1);
ystart=y1;
yend=y2;
y=(1:N)/N*(yend−ystart)+ystart;
theta=2*pi*rand(1,N);           % The alignment angle of N sensors are initilized randomly
xsource=0;           % The source is located at the origin
ysource=0;
```

-continued

```
Pt=1000;                % The transmitted power level from the source is initilized
Prden=Pt./((x−xsource).^2+(y−ysource).^2)/4/pi;       % Power density at sensor location
Er=(Prden*377).^.5.*cos(theta);          % The induced Electric field at the sensor node
kp=2*pi/3; %f=100Mhz, lambda=3m          % Wave number assuming 100 MHz operating frequency
Erphi=exp(−j*((x−xsource).^2+(y−ysource).^2).^.5*kp); % The phase shift between the source and the sensor node
%% Now The source location is swept and at each location, the field strengt is calculated
xmon=−20:.1:20;          % source location X location
ymon=zeros(1,length(xmon));   % source is always on y=0
eff=1;
Pchip=Er.^2/377*1e−6*eff; %It is assumed that the transmitted power evel from each sensor node is proportional to
the received power from the source
        % This is not a eneric assumption and does not
        % hold for active radios
%% The electric filed strength along x axis and y axis are calculated by adding the incomming signals from N
sensors
Exmon=zeros(1,length(xmon));
Eymon=zeros(1,length(xmon));
for k=1:N
    Exmon=Exmon+Erphi(k)*exp(−j*((x(k)−xmon).^2+(y(k)−ymon).^2).^.5*kp).*(377*Pchip(k)./((x(k)−xmon).^2+(y(k)−
ymon).^2)/4/pi).^.5*cos(theta(k));
end;
for k=1:N
    Eymon=Eymon+Erphi(k)*exp(−j*((x(k)−xmon).^2+(y(k)−ymon).^2).^.5*kp).*(377*Pchip(k)./((x(k)−xmon).^2+(y(k)−
ymon).^2)/4/pi).^.5*sin(theta(k));
end;
%% Just for the purpose of illustartion the sensor location and received Electric filed strength for the last iteration
are plotted
xoutput(:,iter)=x;
youtput(:,iter)=y;
Exinput(:,iter)=Exmon;
Eyinput(:,iter)=Eymon;
end;
%% The data is saved and passed to the Neural Network Traier for Classification
save xoutput xoutput
save youtput youtput
save Exinput Exinput
save Eyinput Eyinput
figure(1);
plot(x,y,'.');
figure(2);
plot(xmon,real(Exmon),'.',xmon,real(Eymon),'*');
```

While the above descriptions and associated figures have depicted systems and methods for coherent radiation from a swarm of wirelessly powered and synchronized sensor nodes, it should be clear that any of a variety of configurations for systems and methods for coherent radiation from a swarm of wirelessly powered and synchronized sensor nodes can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A distributed wireless sensor network (WSN) system, comprising:

a set of wirelessly powered microchips;

a radio frequency (RF) transceiver;

wherein:

the RF transceiver is configured to transmit an RF signal;

a plurality of the set of wirelessly powered microchips is configured to be activated when placed in proximity to the RF transceiver transmitting RF signals;

each of the plurality of the set of wirelessly powered microchips is configured to radiate back a signal; and the signals radiated by the plurality of the set of wirelessly powered microchips is different in frequency from, and coherent in phase and frequency to, the RF signal transmitted by RF transceiver.

2. The system of claim 1, wherein each of the set of wirelessly powered microchips comprises a wireless power harvesting system and a transmitter.

3. The system of claim 1, wherein each of the set of wirelessly powered microchips is configured to be activated upon receiving a minimum received power.

4. The system of claim 1, wherein each of the set of wirelessly powered microchips comprises a receiving antenna and a transmitting antenna.

5. The system of claim 4, wherein the RF transceiver comprises a transmitting antenna and a receiving antenna.

6. The system of claim 5, wherein each of the set of wirelessly powered microchips is configured to receive a received power based on relative polarization of the microchip's receiving antenna and the RF transceiver's transmitting antenna.

7. The system of claim 5, wherein the RF transceiver is configured to receive a received power from each of the set of wirelessly powered microchips based upon relative polarization of the microchip's transmitting antenna and the RF transceiver's receiving antenna.

8. The system of claim 1, wherein each of the set of wirelessly powered microchips is configured to utilize three separate on-chip dipole antennas.

9. The system of claim 8, wherein a first antenna of the three separate on-chip dipole antennas is configured to receive a wireless power, a second antenna of the three separate on-chip dipole antennas is configured to receive a wireless reference signal, and a third antenna of the three separate on-chip dipole antennas is configured to transmit back a coherent wireless signal.

10. The system of claim 1, wherein each of the set of wirelessly powered microchips uses one or two antennas for receiving the wireless power, receiving the wireless reference signal, and transmitting back a coherent wireless signal.

11. The system of claim 1, wherein the set of wirelessly powered microchips are distributed in an uneven manner within an environment, wherein their orientations and positions are randomly placed.

12. The system of claim 1, wherein the RF transceiver is moved through an environment and receipt of the signals radiated by the plurality of the set of wirelessly powered microchips by the RF transceiver is utilized for localization, whereby locations of the plurality of the set of wirelessly powered microchips are determined.

13. The system of claim 1, wherein an amplitude of RF signals transmitted by the RF transceiver is changed to activate different sets of wirelessly powered microchips for localization.

14. The system of claim 1, wherein an amplitude of the RF signals transmitted by the RF transceiver is increased to active microchips located at further distances from the RF transceiver.

15. The system of claim 1, wherein a frequency of the RF signals transmitted by the RF transceiver is changed to obtain information regarding a surrounding environment.

16. The system of claim 1, further comprising using a machine learning process to identify a SWARM signal signature for a particular measurement objective.

17. The system of claim 16, wherein the measurement objective is to extract a geometry of a physical structure of an underground fracture network.

18. The system of claim 1, wherein different sets of wirelessly powered microchips are activated for different settings of the RF transceiver.

19. The system of claim 1, wherein a microchip is configured to sense a surrounding environment.

20. The system of claim 19, wherein a microchip is configured to sense at least one characteristic with respect to a surrounding environment selected from the group consisting of a temperature, pressure, flow rate, chemical substance, and dielectric constant of a surrounding environment.

* * * * *